United States Patent [19]
Beckett et al.

[11] Patent Number: 5,663,803
[45] Date of Patent: *Sep. 2, 1997

[54] ENGRAVING METHOD AND APPARATUS FOR ENGRAVING AREAS USING A SHAPING SIGNAL

[75] Inventors: Tony D. Beckett, Dayton; David R. Seitz, Vandalia; Eric J. Serenius, Springboro, all of Ohio

[73] Assignee: Ohio Electronic Engravers, Inc., Dayton, Ohio

[*] Notice: The term of this patent shall not extend beyond the expiration date of Pat. No. 5,438,422.

[21] Appl. No.: 434,592

[22] Filed: May 4, 1995

Related U.S. Application Data

[63] Continuation-in-part of Ser. No. 125,938, Sep. 23, 1993, Pat. No. 5,440,398, which is a continuation-in-part of Ser. No. 38,679, Mar. 26, 1993, Pat. No. 5,438,422, which is a continuation-in-part of Ser. No. 22,127, Feb. 25, 1993, Pat. No. 5,424,845.

[51] Int. Cl.$^6$ .............................. B41C 1/04; H04N 1/387
[52] U.S. Cl. .............................. 358/299; 358/298
[58] Field of Search .............................. 358/299, 298

[56] References Cited

U.S. PATENT DOCUMENTS

| Re. 23,914 | 12/1954 | Boyajean | 178/6.6 |
|---|---|---|---|
| 2,112,010 | 3/1938 | Brimberg | 178/6.6 |
| 2,160,951 | 6/1939 | Alice | 178/13 |
| 2,164,209 | 6/1939 | Howey et al. | 178/5.6 |
| 2,441,651 | 5/1948 | Thompson | 179/100.41 |
| 2,925,464 | 2/1960 | Raible | 178/6.6 |
| 3,280,252 | 10/1966 | Lilien et al. | 178/6 |
| 3,612,753 | 10/1971 | Korman | 178/5.2 A |
| 3,769,455 | 10/1973 | De vos et al. | 178/6.6 B |
| 3,770,888 | 11/1973 | De vos et al. | 178/6.6 B |
| 3,784,739 | 1/1974 | De vos et al. | 178/6.6 B |
| 4,007,362 | 2/1977 | Sindermann | 235/151 |
| 4,079,235 | 3/1978 | Froyd et al. | 364/107 |
| 4,126,821 | 11/1978 | Cannon | 318/696 |
| 4,189,752 | 2/1980 | Moe et al. | 358/298 |
| 4,245,260 | 1/1981 | Doelves | 358/299 |
| 4,342,052 | 7/1982 | Rackley et al. | 358/287 |
| 4,347,785 | 9/1982 | Chase et al. | 101/1 |
| 4,357,633 | 11/1982 | Buechler | 358/299 |
| 4,450,486 | 5/1984 | Buechler | 358/299 |
| 4,603,391 | 7/1986 | Inoue et al. | 364/474 |
| 4,678,976 | 7/1987 | Inoue | 318/577 |
| 4,683,500 | 7/1987 | Kitamura et al. | 358/280 |
| 4,688,101 | 8/1987 | Doelves et al. | 358/299 |
| 5,229,861 | 7/1993 | Nozaka et al. | 358/299 |
| 5,293,426 | 3/1994 | Wauch et al. | 382/1 |
| 5,329,215 | 7/1994 | Fraser et al. | 318/603 |
| 5,438,422 | 8/1995 | Holowko et al. | 358/299 |

OTHER PUBLICATIONS

"Datwyler," MDC Max Datwyler Corp., USA, 13420 W. Reese Blvd., Huntersville, NC 28078, undated brochure.

(List continued on next page.)

*Primary Examiner*—Eric Frahm
*Attorney, Agent, or Firm*—Jacox, Meckstroth & Jenkins

[57] ABSTRACT

The engraving method and apparatus provides a method and apparatus for engraving a plurality of cells in a surface of a cylinder. The engraving method and apparatus involves, among other things, processing a plurality of image data; modifying at least a portion of the image data and generating a signal corresponding thereto; and then exciting an engraving device in response to the signal in order to engrave a pattern of engraved areas. The engraving method and apparatus facilitate adjusting a characteristic of at least one of said plurality of engraved areas in order to change a spatial relationship between said at least one of said plurality of engraved areas and another of said plurality of engraved areas to provide, for example, a non-regular or non-periodic spacing of engraved areas. The engraving method and apparatus provides a shaping data generator for generating shaping data to be used to modify the image data corresponding to an area to be engraved to redefine at least a portion of said data to provide an engraved area having a desired shape.

53 Claims, 38 Drawing Sheets

OTHER PUBLICATIONS

"Polishmaster Junior High–Precision Machining and Measuring Center for Rotogravure Cylinders," MDC Max Datwyler AG, CH–3368 Bleienbach/Schweiz, Switzerland, undated.

"Finishmaster Unit for Polishing of Rotogravure Cylinders After Copper or Chrome Plating," MDC Max Datwyler AG, CH–3368 Bleienbach/Schweiz, Switzerland, undated.

"Cu–Master Type E Plating Tanks for Copper–Plating of Rotogravure Cylinders," MDC Max Datwyler AG, CH–3368 Bleienbach/Schweiz, Switzerland, undated.

"Cr–Master Type E Plating Tanks for the Chrome–Plating of Rotogravure Cylinders," MDC Max Datwyler AG, CH–3368 Bleienbach/Schweiz, Switzerland, undated.

"Twin–Pilot," Maschinenfabrik Kaspar Walter GmbH & Co., KG, Phinganserstrasse 22, 8000 Munchen 70, Germany, undated brochure.

JAV, "Getting Better Accuracy with Non–Precision Ball Screws," American Machinist, Feb. 1993, pp. 50–51.

*Signal Processing Algorithms Using Fortran and C* by Samuel D. Sterns and Ruth A. David Prentice Hall: Englewood Cliffs, NJ, 1993, pg. 103.

*System Identification and Control Design Using P.I.M. + Software* by Ioan Dore Landau Prentice Hall: Englewood Cliffs, NJ, 1990, p. 134.

"Cu–Master Type E Plating Tanks for Copper–Plating of Rotogravure Cylinders," MDC Max Datwyler AG, CH–3368 Bleienbach/Schweiz, Switzerland, undated.

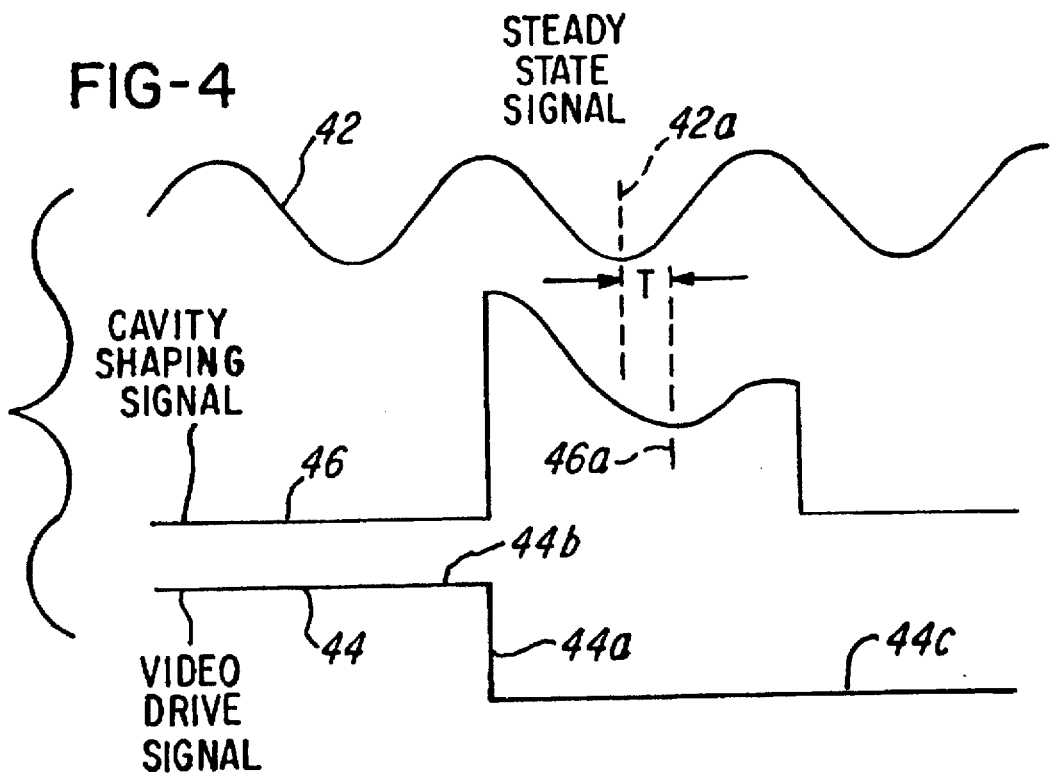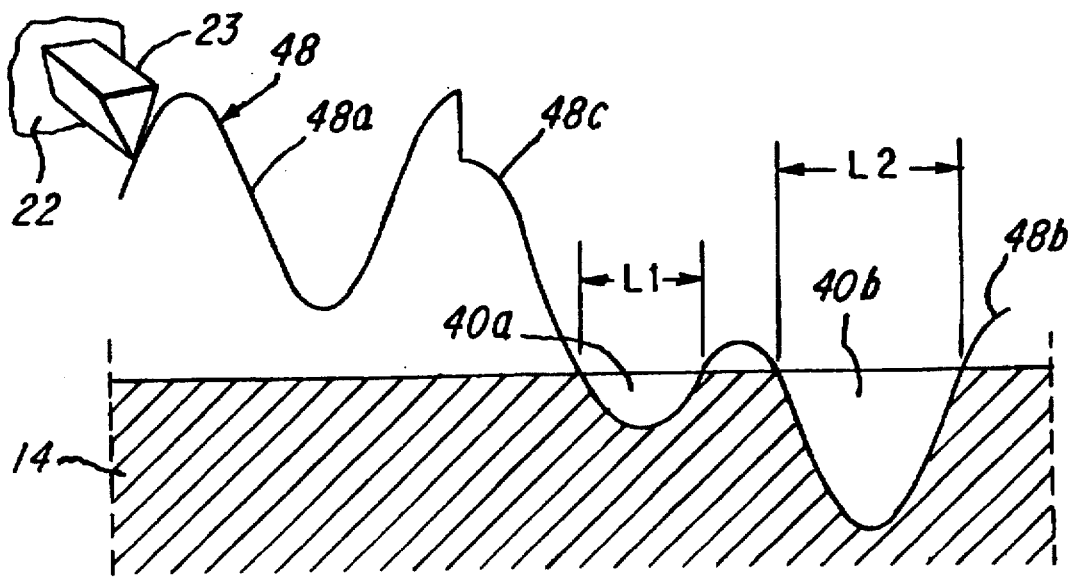

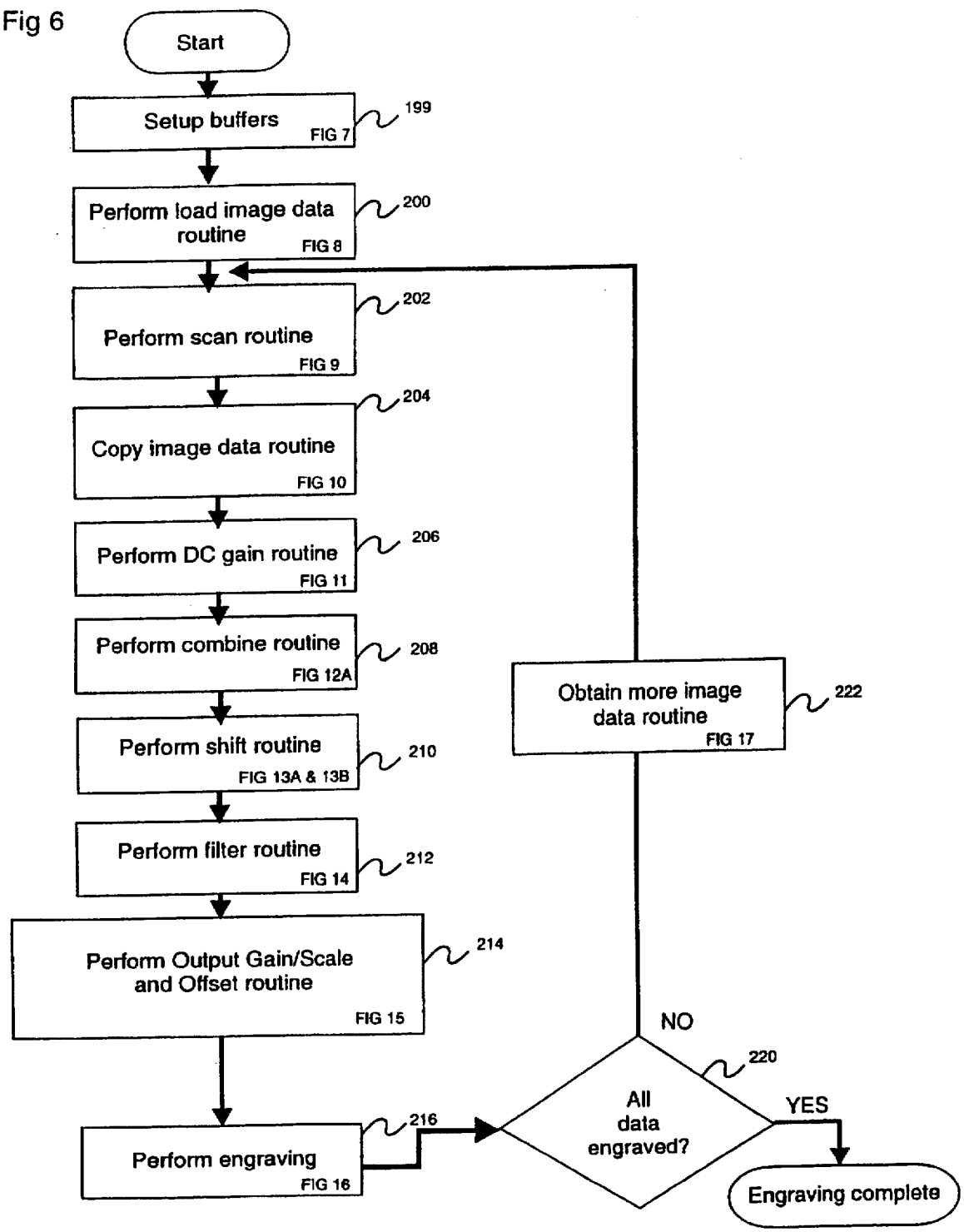

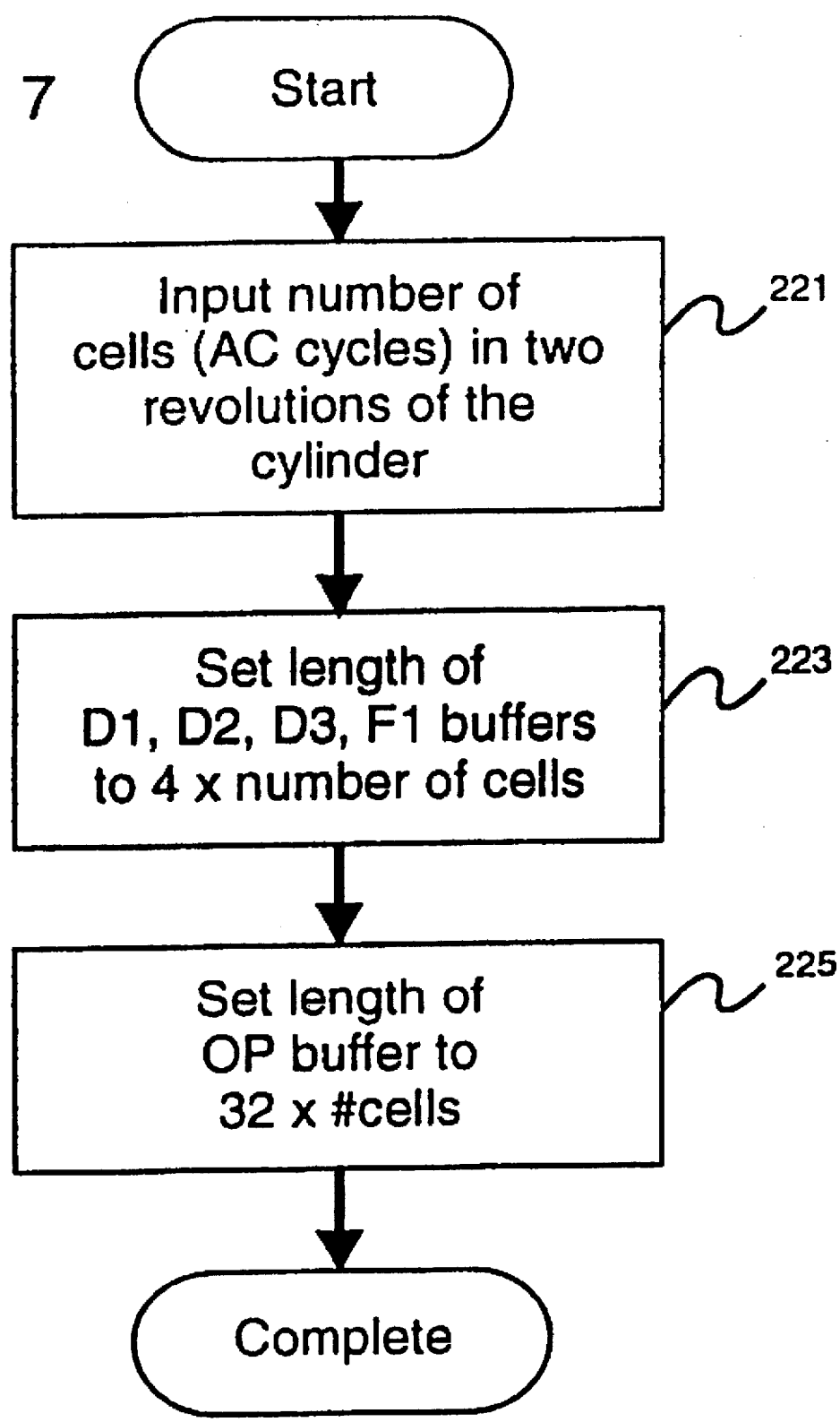

FIG-12B

TABLE — 57a

| | |
|---|---|
| 0 | 1000 |
| 1 | 970 |
| 2 | 940 |
| 3 | 910 |
| ⋮ | ⋮ |
| 30 | 1030 |
| 31 | 1060 |

57

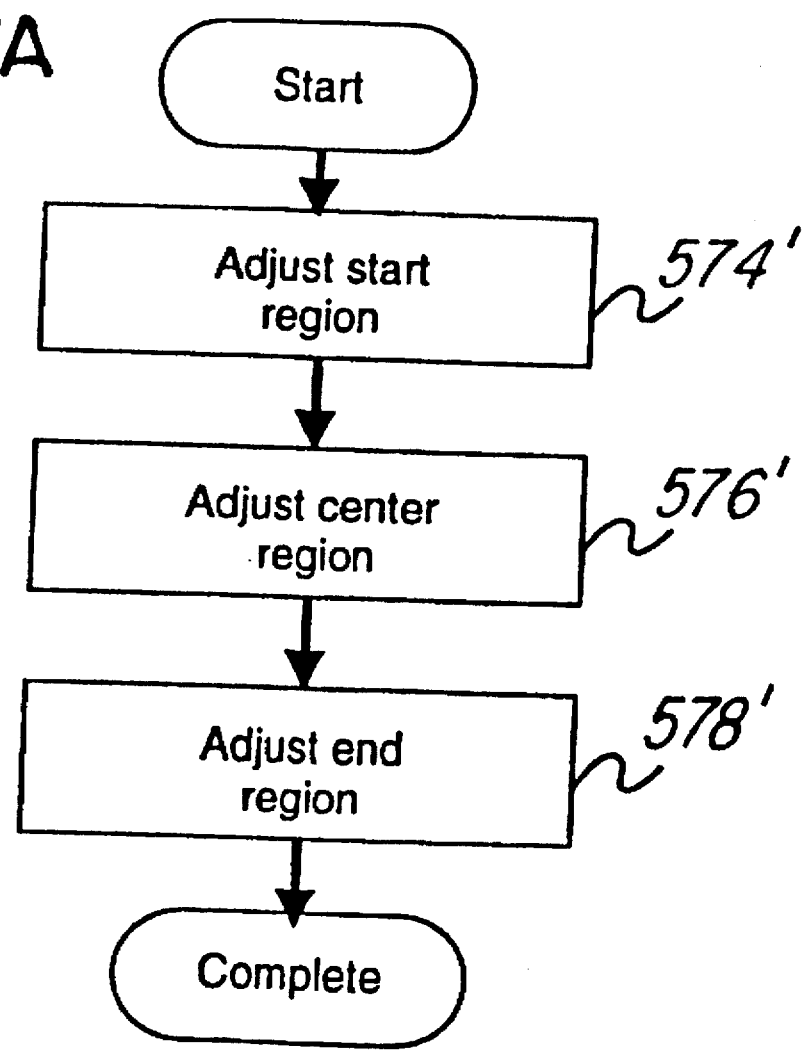

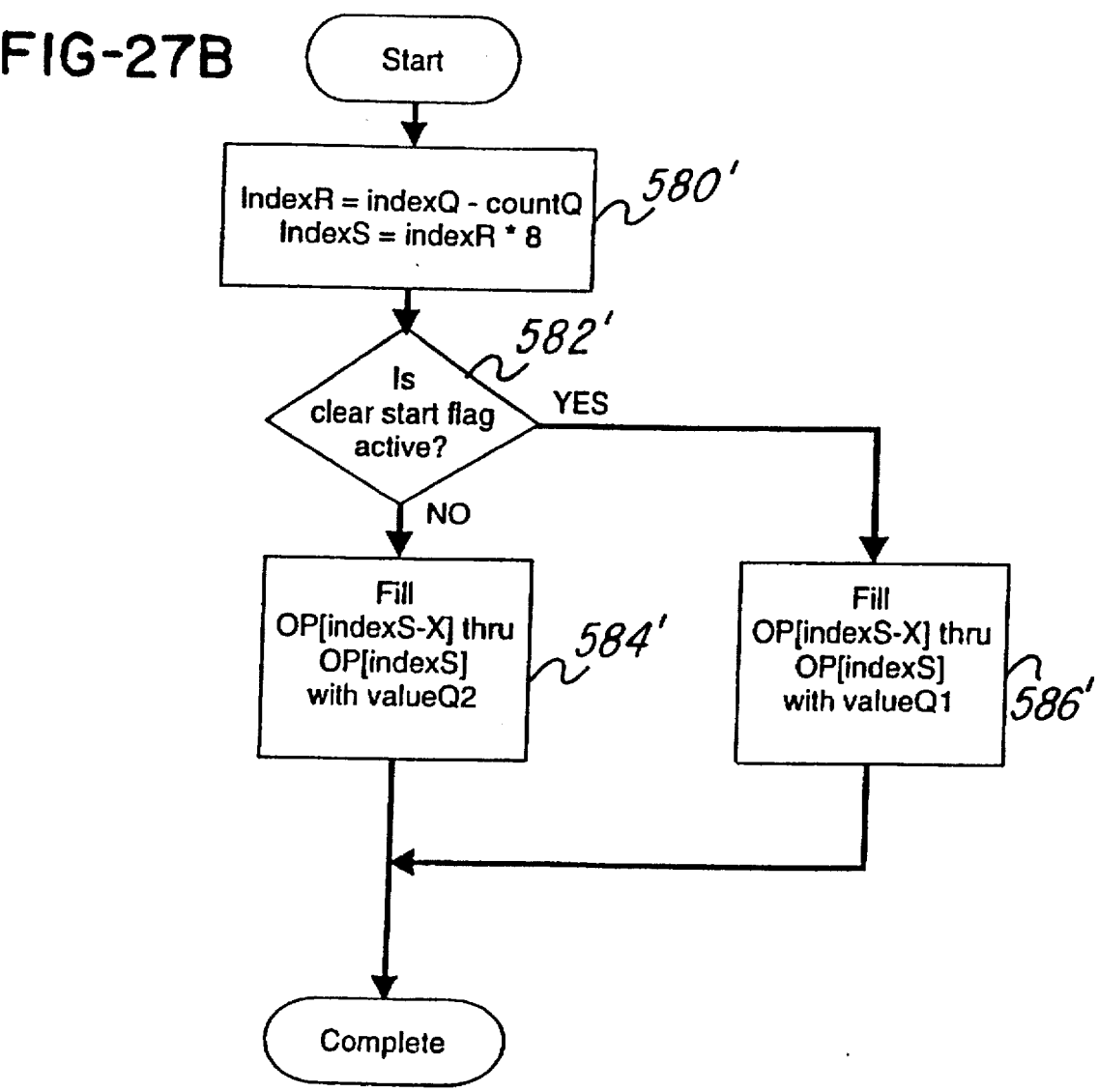

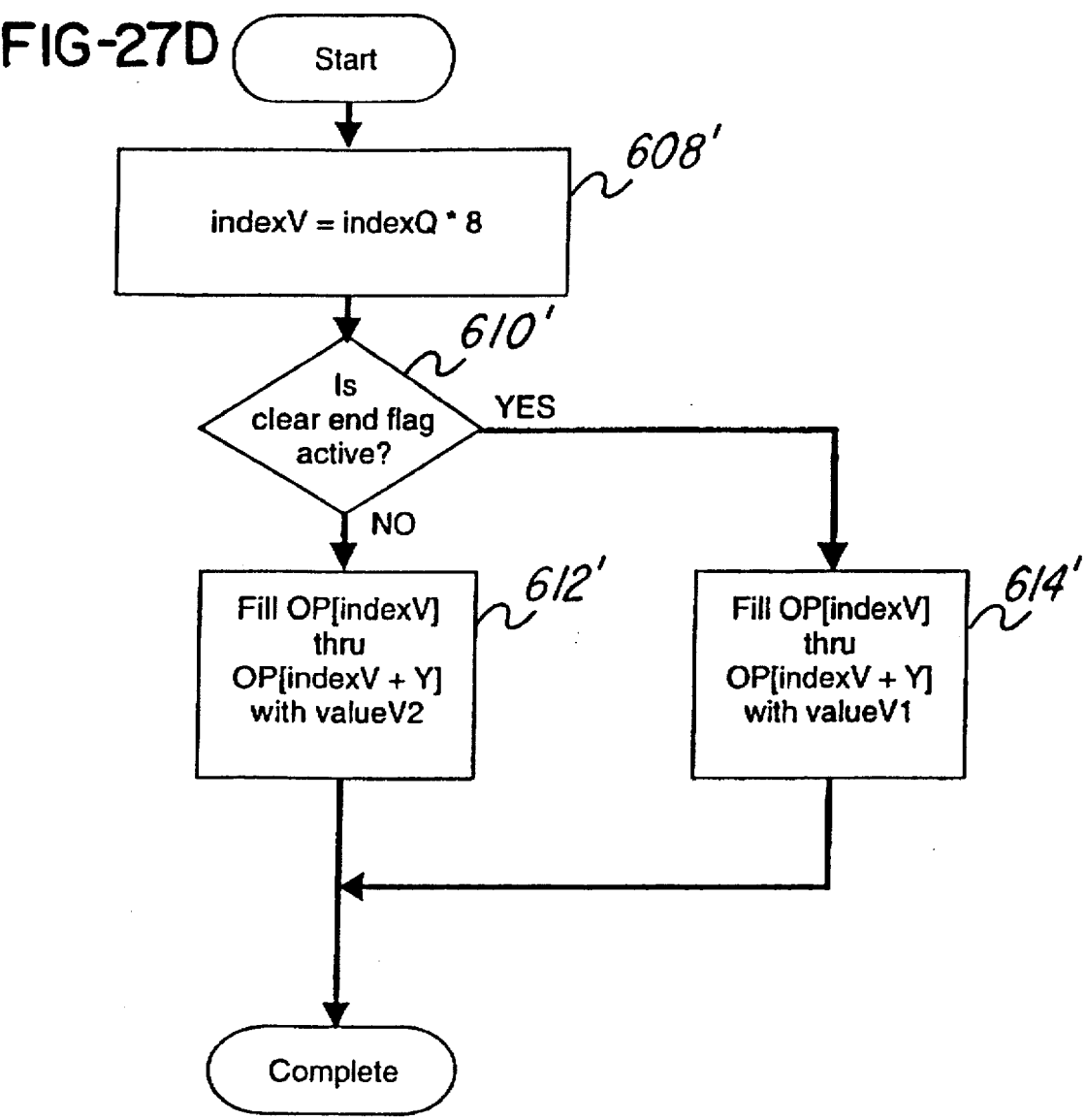

ENGRAVING METHOD AND APPARATUS FOR ENGRAVING AREAS USING A SHAPING SIGNAL

CROSS REFERENCE TO RELATED APPLICATIONS

This application is a continuation-in-part of U.S. application Ser. No. 08/125,938 filed Sep. 23, 1993, now U.S. Pat. No. 5,440,398, which is a continuation-in-part of U.S. application Ser. No. 08/038,679 filed Mar. 26, 1993, now U.S. Pat. No. 5,438,422, which is a continuation-in-part of U.S. application Ser. No. 08/022,127 filed Feb. 25, 1993, now U.S. Pat. No. 5,424,845, all of which are owned by the same assignee as the present invention and all of which are incorporated herein by reference.

BACKGROUND OF THE INVENTION

1. Field of the Invention

This invention relates to engraving and, more particularly, to the art of engraving desired geometric patterns on a surface of a cylinder.

2. Description of Related Art

A helical gravure engraver creates periodic ink-receiving cavities, cells or areas on a printing cylinder by rotating the cylinder about its cylindrical axis while moving an engraving head in a direction parallel to the cylinder axis. Engraved areas are engraved on the surface of the cylinder by oscillating an engraving device, such as a diamond stylus, into engraving contact with the cylinder. A cell or cavity is engraved each time the stylus is oscillated into contact with the printing cylinder. The resulting cavities are arranged along a continuous helical track or in adjacent cylindrical tracks.

The stylus may be mounted on the engraving head as generally described in Buechler, U.S. Pat. No. 4,450,486 and may be controlled as described in U.S. Pat. Nos. 5,424,845 and 5,438,422, respectively. As explained in U.S. Pat. Nos. 5,424,845 and 5,438,422, the stylus is oscillated at a frequency having an odd number of half wavelengths during a full engraving rotation. This causes a staggering of engraved areas engraved on successive rotations of the cylinder. The engraving head is advanced an axial distance equal to one-half of a black cell width plus one-half of a connecting channel width, plus one separating wall width during each complete rotation of the printing cylinder. This causes a nesting of cavities which are engraved during successive rotations.

As also taught by U.S. Pat. Nos. 5,424,845 and 5,438,422, the engraver engraves cavities having a size which corresponds to a grey level to be printed by the printing cylinder. The cavity depth is controlled by a stylus driver acting in response to the combined levels of a DC video signal, a white offset signal, and an AC signal. The DC gain and the AC gain may be controlled by a set-up circuit in accordance with a series of set-up parameters.

While the above-described prior art system faithfully engraves cells at a regular frequency which will print a desired grey level, there is a problem with edge definition. This is due to the fact that geometrical patterns are represented by nested clusters of cells. This invention provides an apparatus and method for altering the relative position between two or more engraved areas which, in turn, facilitates providing patterns having, for example, improved edge or line definition.

SUMMARY OF THE INVENTION

An object of this invention is to provide a method and apparatus which permits spacing between engraved areas in a pattern to be changed or manipulated. This, in turn, facilitates defining a pattern having a non-periodic or non-regular frequency arrangement of engraved cells.

In accordance with one method of the invention, a cylinder is engraved while being rotated about its cylindrical axis. An engraving device is oscillated into engraving contact with the surface of the cylinder while being axially advanced in synchronism with the rotation and the oscillation. The frequency of the oscillation is such that cavities in successive helical turns are circumferentially shifted one-half of an oscillating wavelength. Axial advancement of the engraving device proceeds at a speed such that cavities engraved during any helical turn are nested with cavities in columns engraved during adjacent turns. Shifting and compression, for example, of an engraved area is produced by generating shaping data and applying this data to combined data corresponding to at least a portion of an image.

The apparatus of the invention comprises a driver for driving the engraving device into engraving contact with a cylinder, video signal means connected to the driver for causing the engraving device to perform an engraving action corresponding to an image to be reproduced, oscillation signal means connected to the driver for causing the engraving action to proceed by engraving a series of cavities at a non-regular or non-periodic frequency, and cavity-shaping means operating in timed relation for adjusting the placement of an edge of a lead cavity in a series of cavities.

It is therefore an object of the invention to improve, among other things, the edge definition of a pattern engraved upon a cylinder.

A further object of the invention is to provide a method for engraving an image having at least one edge and comprising the step of engraving an area having a predetermined dimension to facilitate defining the at least one edge.

A further object of the invention is the provision of a method for engraving an image having at least one line on a cylinder in an engraver comprising the steps of generating at least one signal corresponding to a plurality of engraved areas which make up at least a portion of said image and processing the at least one signal in order to alter a dimension of at least one of said plurality of engraved areas.

Yet another embodiment of the invention is a method for modifying a cell characteristic of a cell to be engraved in a surface of a workpiece comprising the steps of identifying said cell to be modified and modifying an engraving signal corresponding to the cell in order to change at least one engraving characteristic of the cell.

Still yet another object of the invention is the provision of a method for engraving a plurality of engraved areas corresponding to an image comprising the steps of modifying a characteristic of at least one of the plurality of engraved areas to provide at least one modified engraved area, generating a signal in response to said at least one modified engraved area and energizing an engraving device to engrave a pattern in response to the signal.

A further object of the invention is to provide a method of engraving comprising the steps of rotatably mounting a cylinder in an engraver, situating an engraving device in operative relationship with the cylinder, modifying a characteristic of at least one of the plurality of engraved areas to provide at least one modified engraved area, generating a second signal in response to the first signal and the at least one modified engraved area, and energizing an engraving device to engrave a pattern in response to the second signal.

A further object of the invention is to provide a method for engraving a plurality of cells which define a pattern defining at least one edge on a surface of a cylinder, comprising the steps of generating an edge signal corresponding to an edge cell situated in said pattern, energizing an engraving device in response to the edge signal to engrave said edge cell at a predetermined location in the pattern to facilitate defining the at least one edge.

Another object of the invention is to provide an engraver for engraving a pattern having at least one edge, comprising a bed, a headstock and a tailstock for rotatably supporting a cylinder on the bed, an engraving device mounted on said bed for engraving a surface of the cylinder, a controller for controlling operation of the engraver and coupled to the engraving device, and a signal generator located in the controller for receiving image data corresponding to an engraved area having a predetermined characteristic, for processing the image data in order to change the predetermined characteristic to facilitate defining the at least one edge, and for generating an engrave signal in response thereto for energizing the engraving device.

Another object is to provide a system and method for modifying or altering a characteristic, dimension or location of data associated with an area to be engraved to facilitate defining a pattern having a desired feature, such as sharp definition.

Other objects and advantages of the invention will be apparent from the following written description, the attached drawing and the appended claims.

BRIEF DESCRIPTION OF ACCOMPANYING DRAWINGS

FIG. 3 is another fragmentary view of cylinder 14 showing another pattern of a plurality of engraved areas and also showing a vertical trench or elongated cavity which defines an edge 36a;

FIG. 4 is a view showing a steady state signal, cavity shaping signal and video drive signal;

FIG. 5 is a view of a combined output signal;

FIG. 6 is a general flow chart of a method in controller 17 according to one embodiment of this invention;

FIG. 7 is a flow chart of a set-up routine situated in controller 17;

FIG. 12B illustrates a table situated in controller 17 comprising a plurality of data values which define a period for a sinusoidal wave form;

Figure 19:
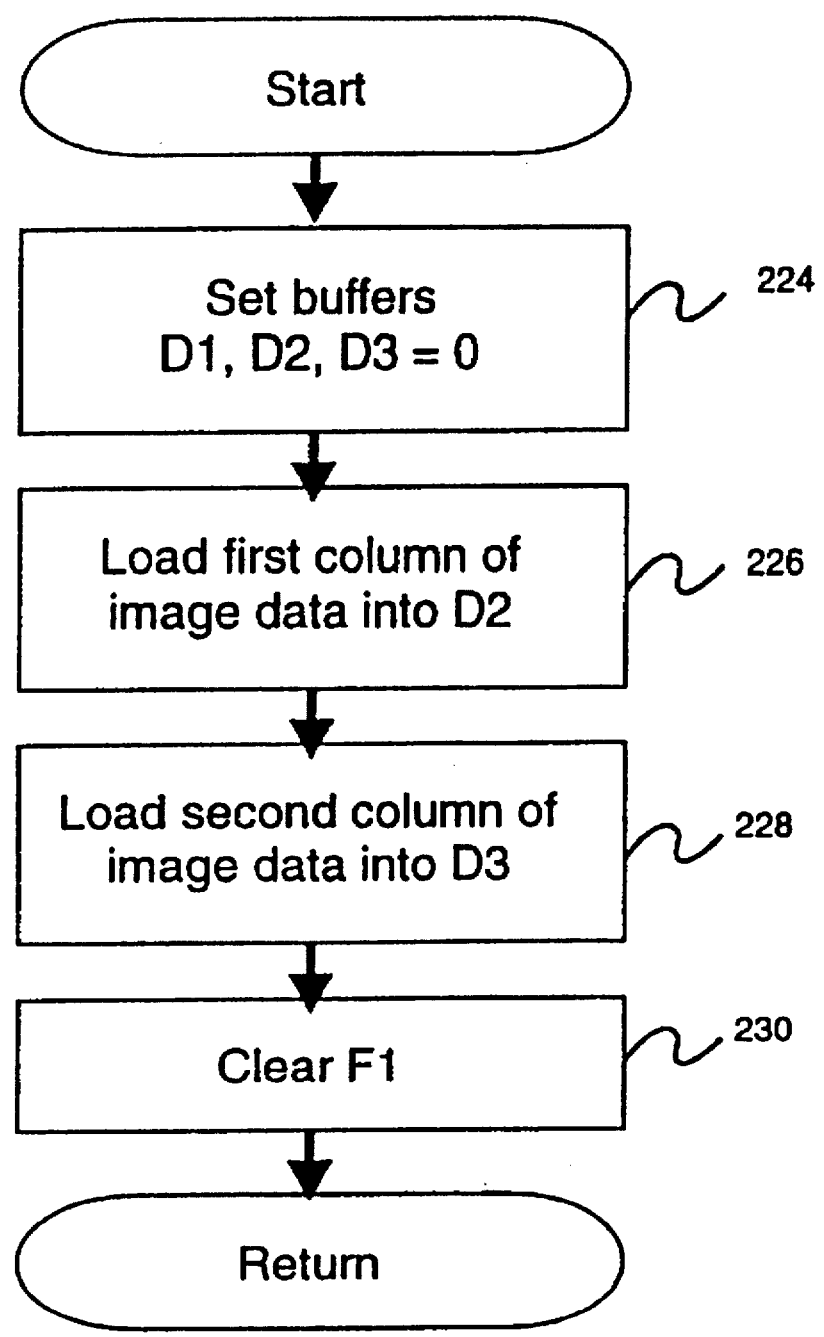
Figure 20:
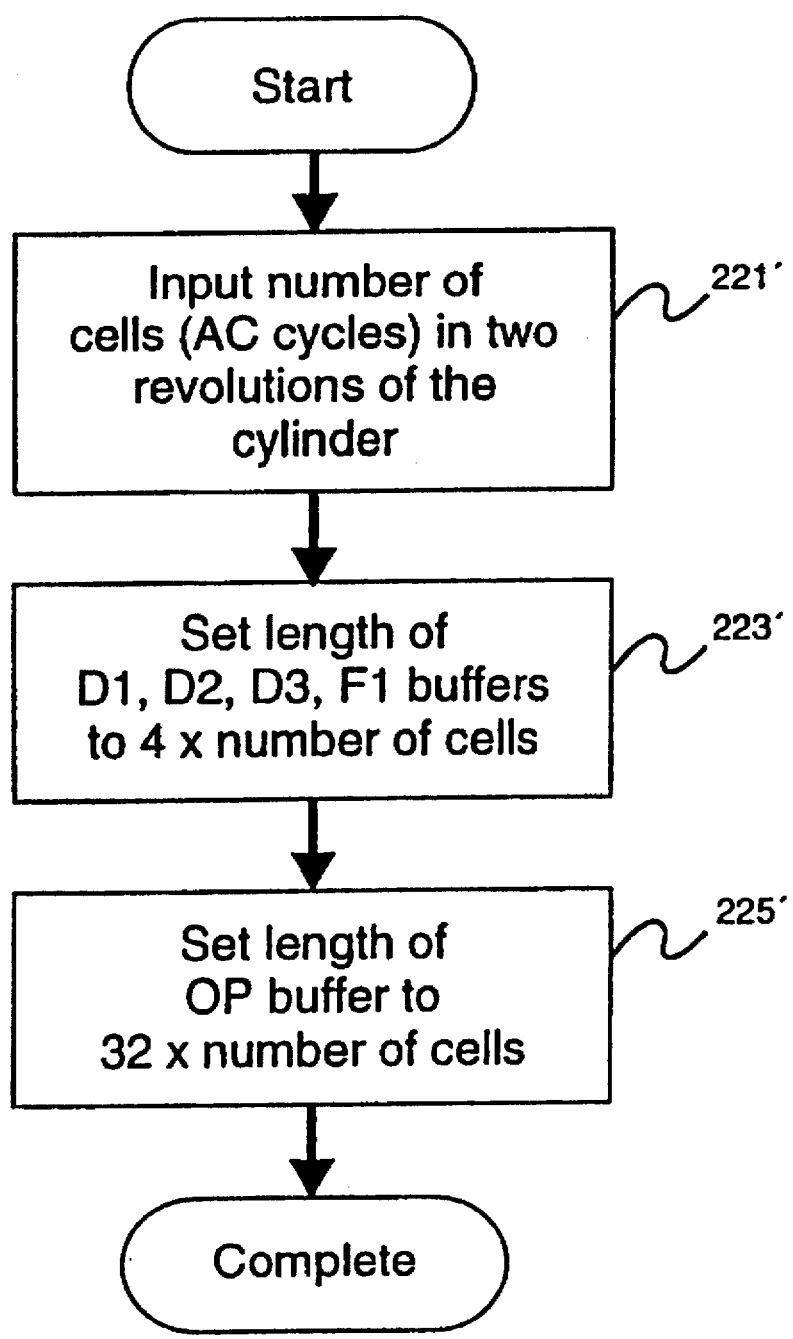
Figure 21:
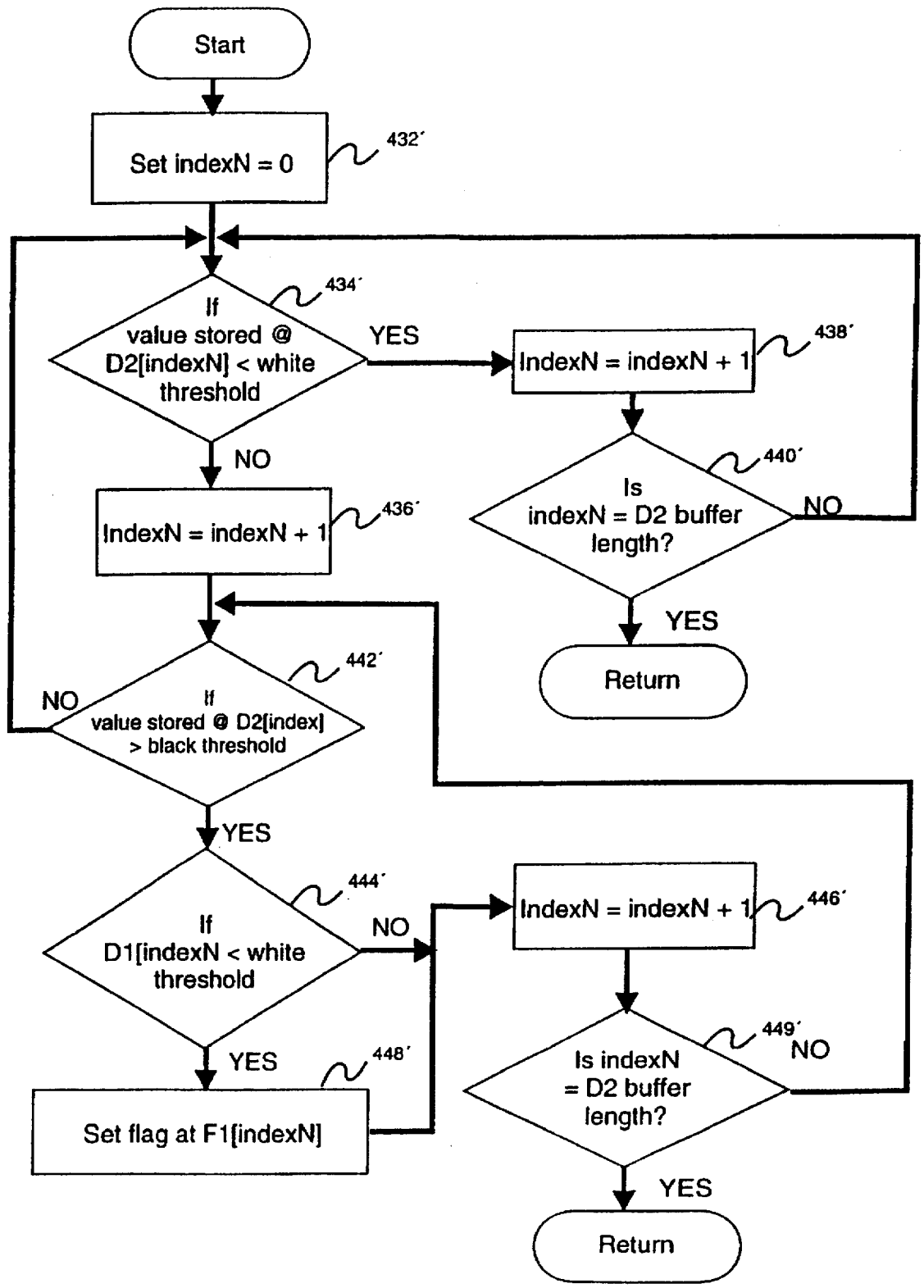
Figure 22A:
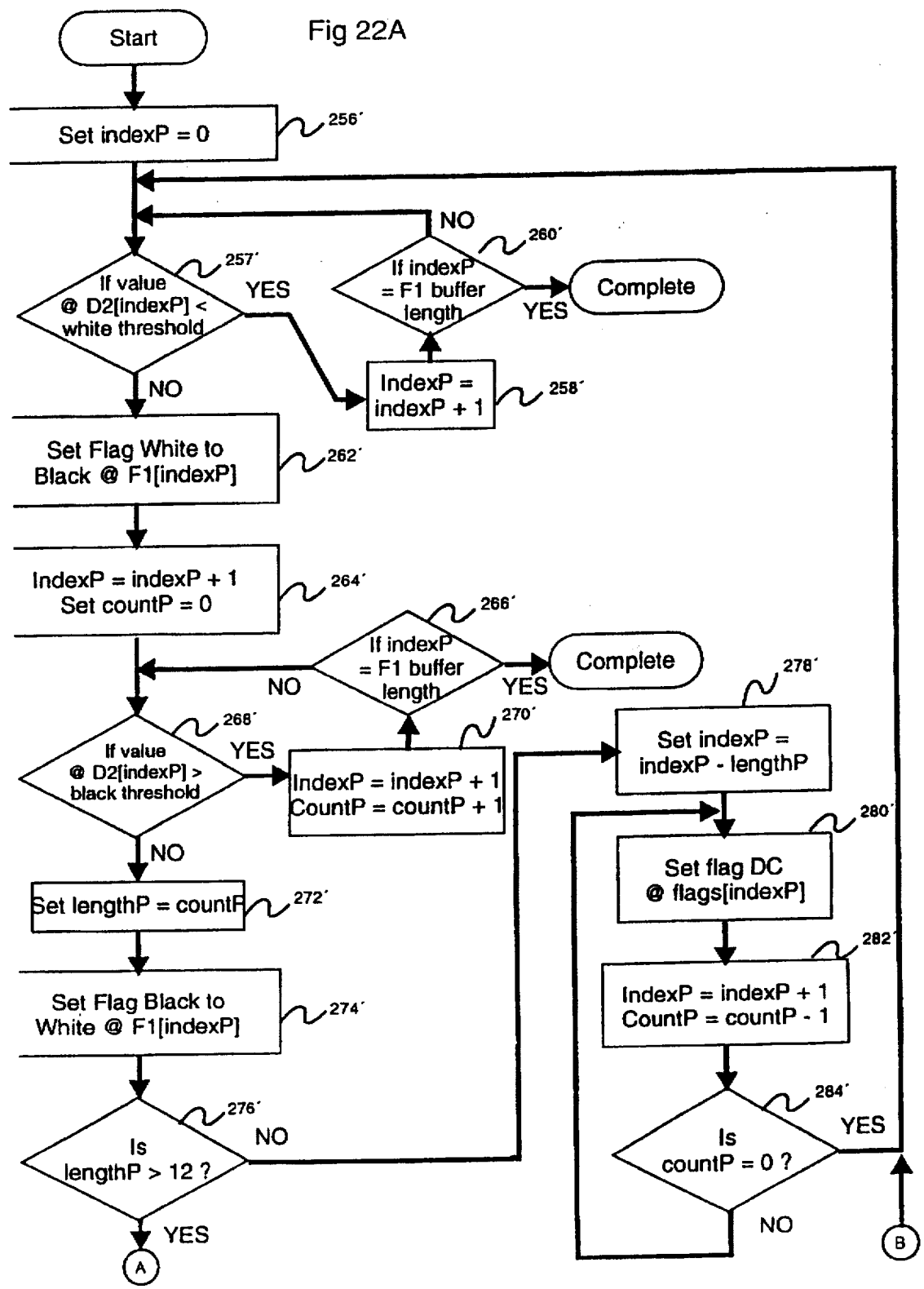
Figure 22B:
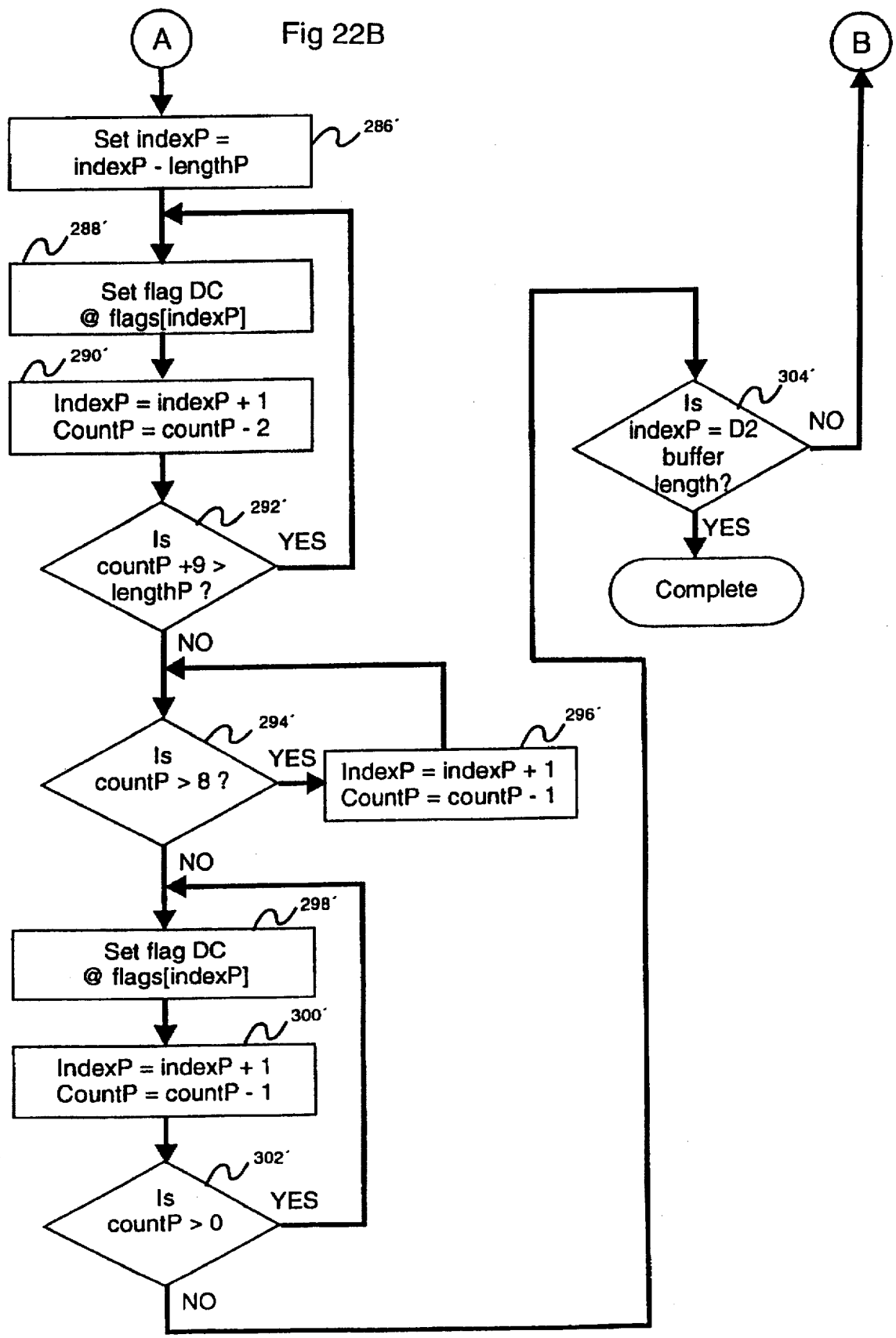
Figure 23:
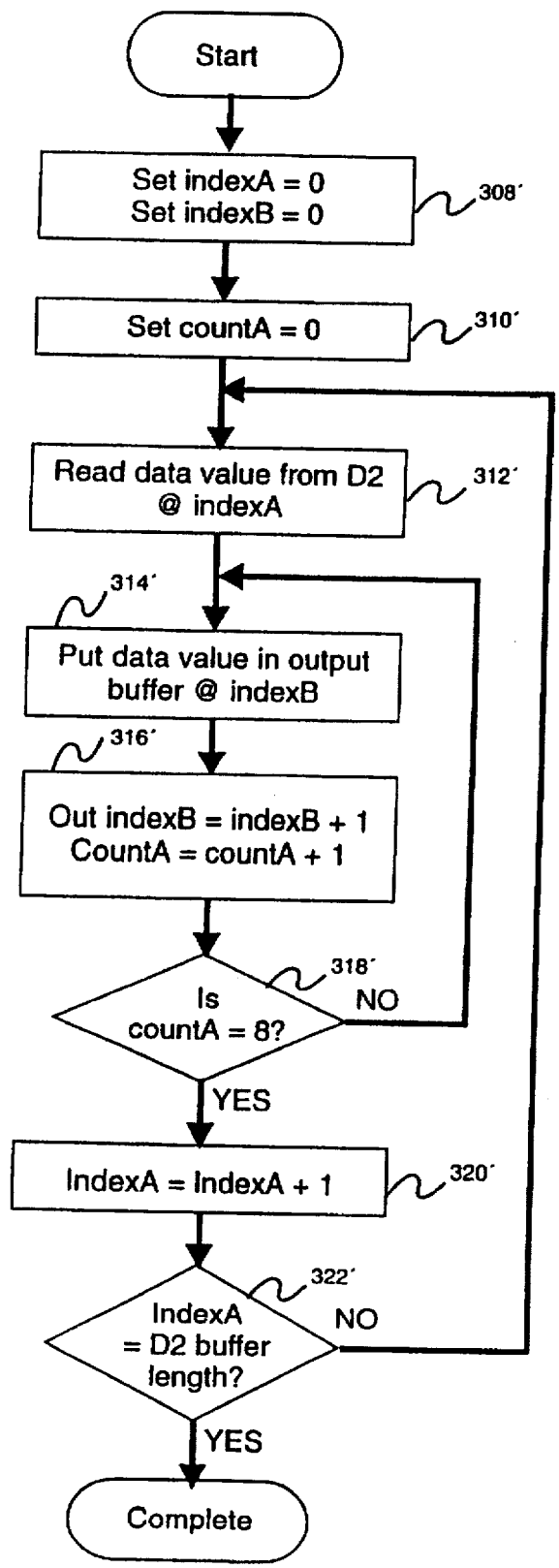
Figure 24:
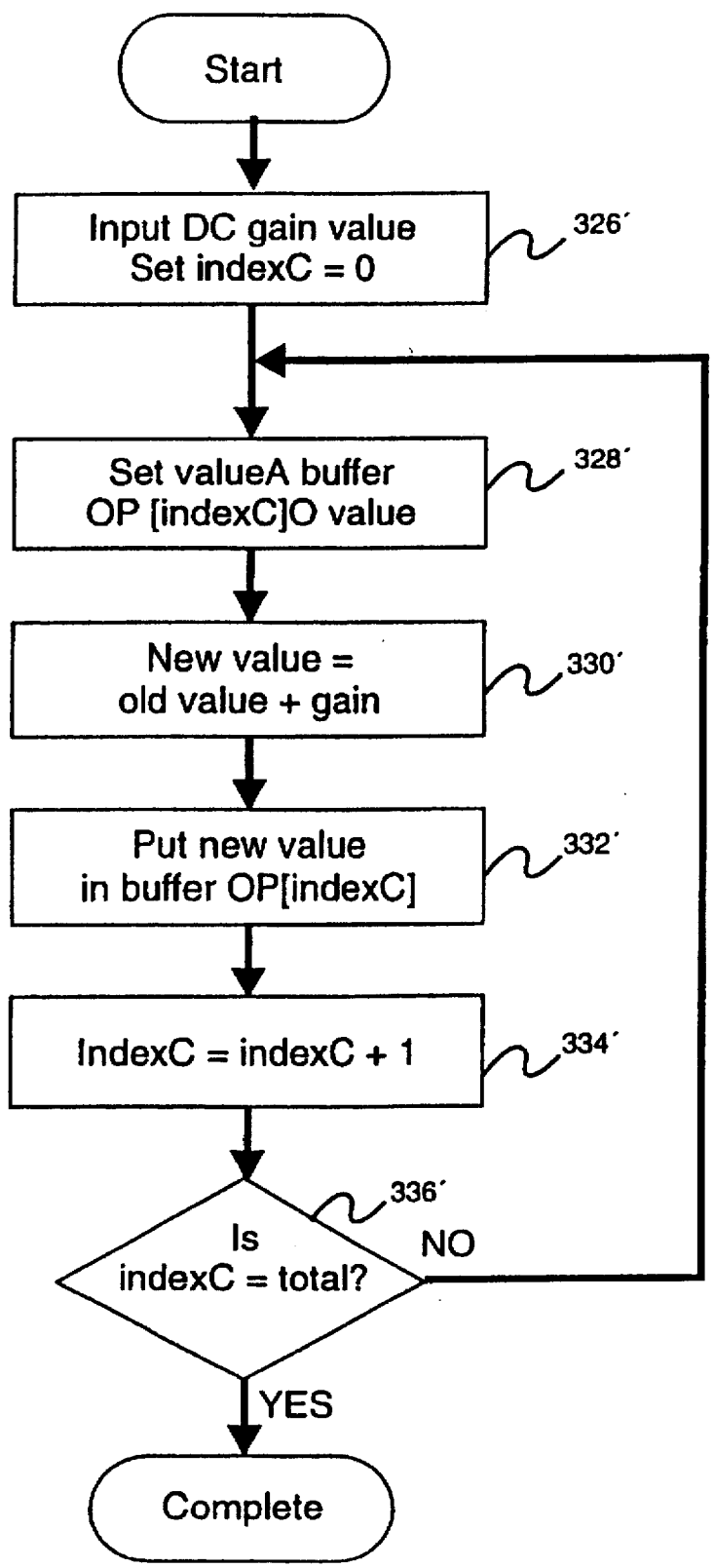
Figure 25:
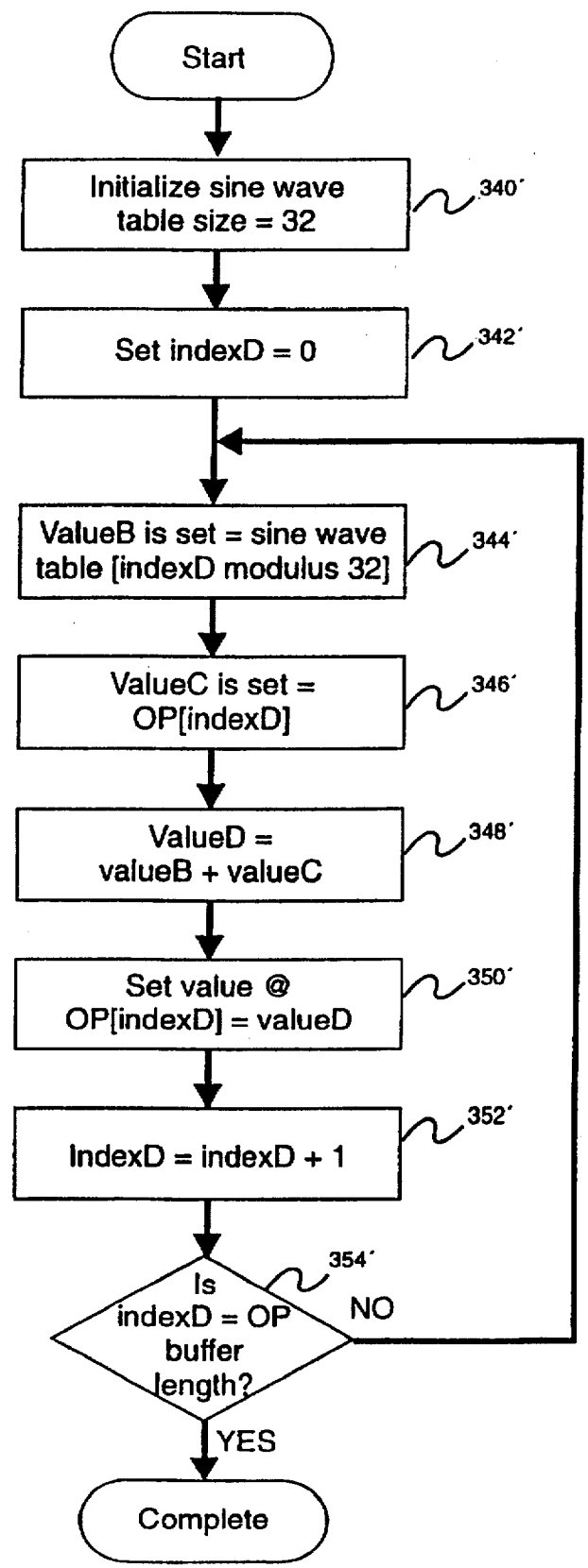
Figure 26:
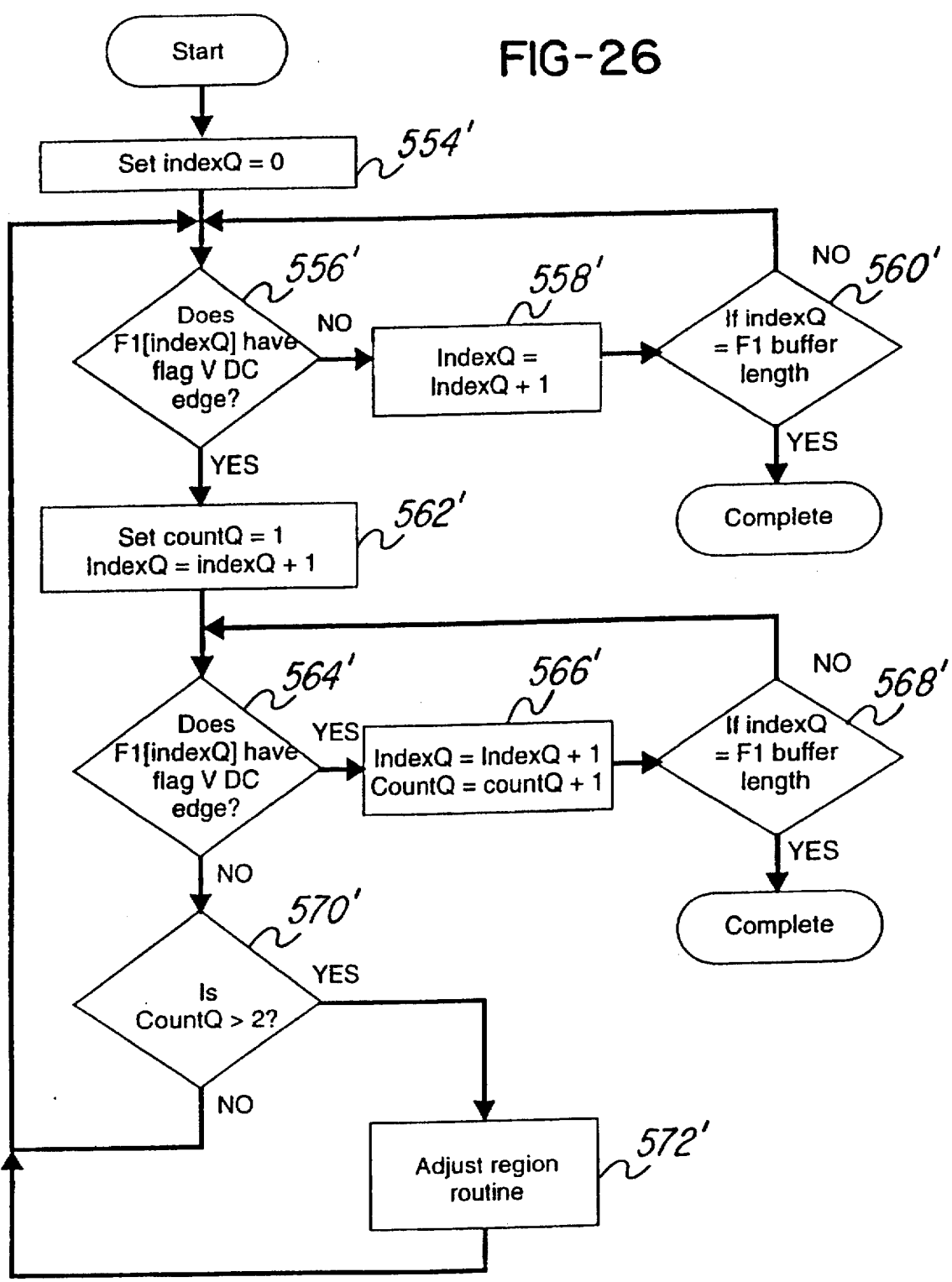
Figure 27C:
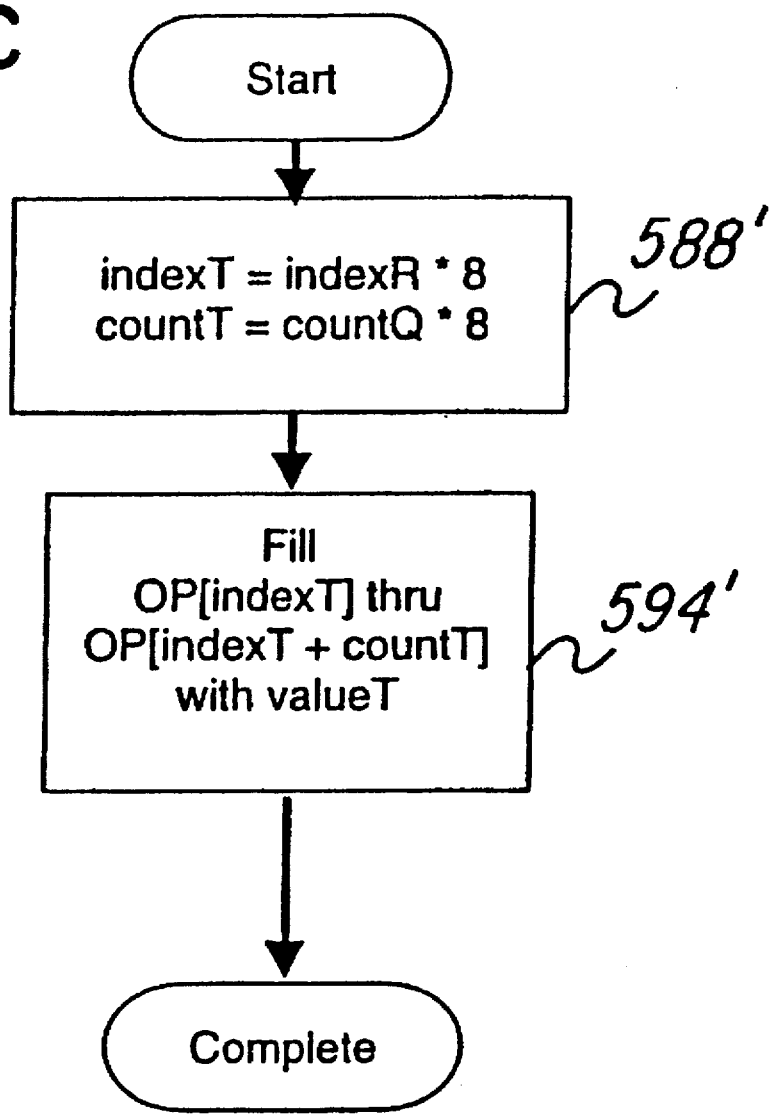
Figure 28:
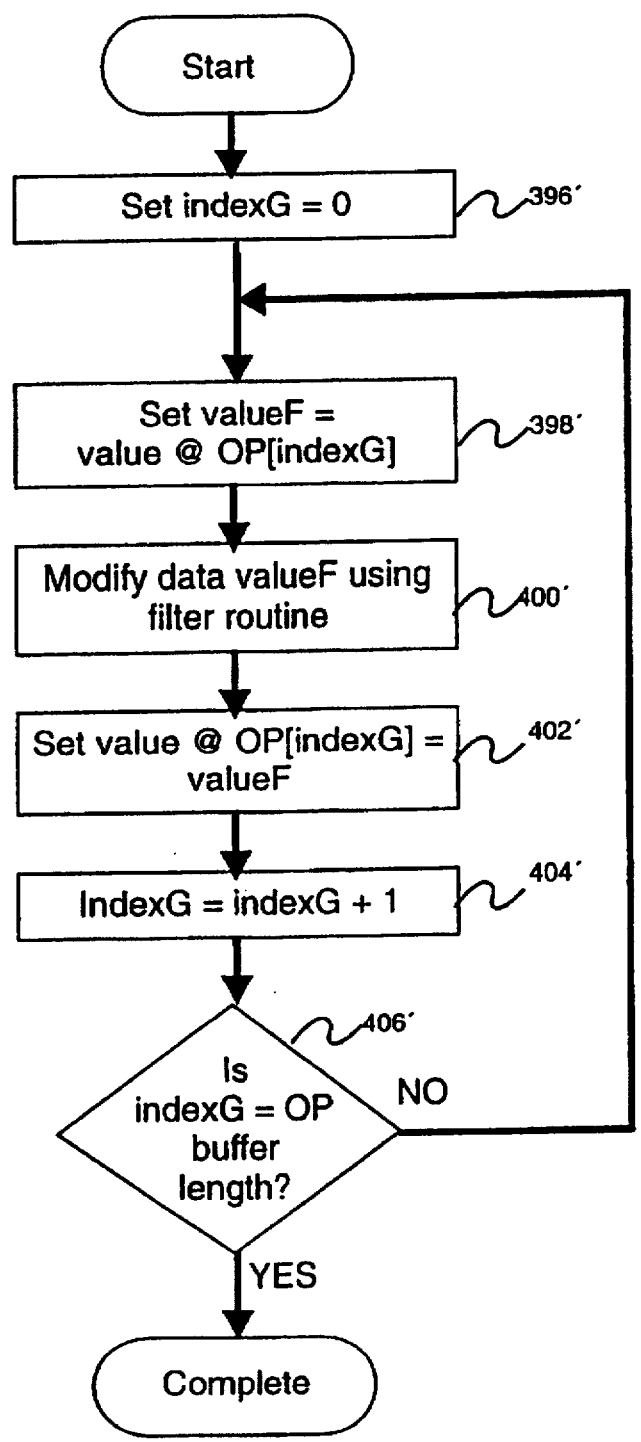
Figure 29:
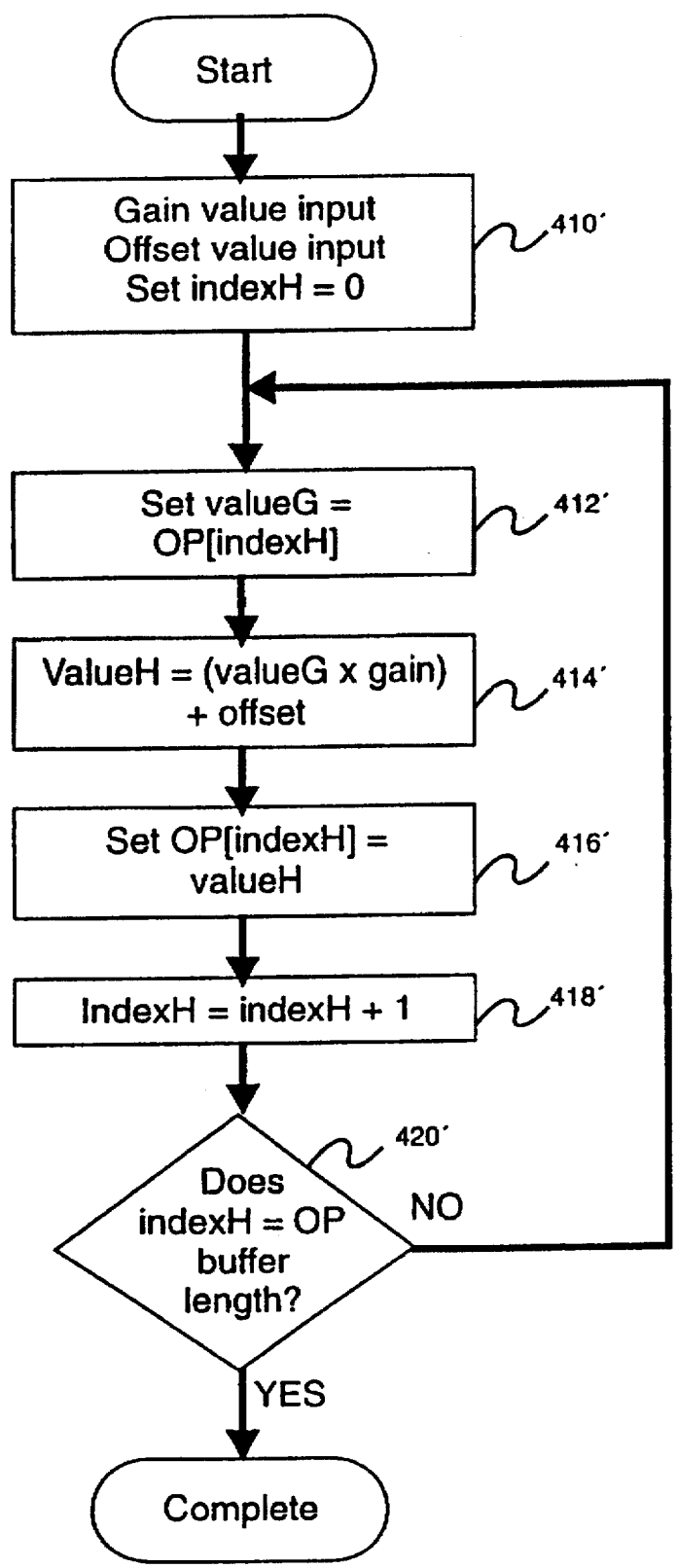
Figure 30:
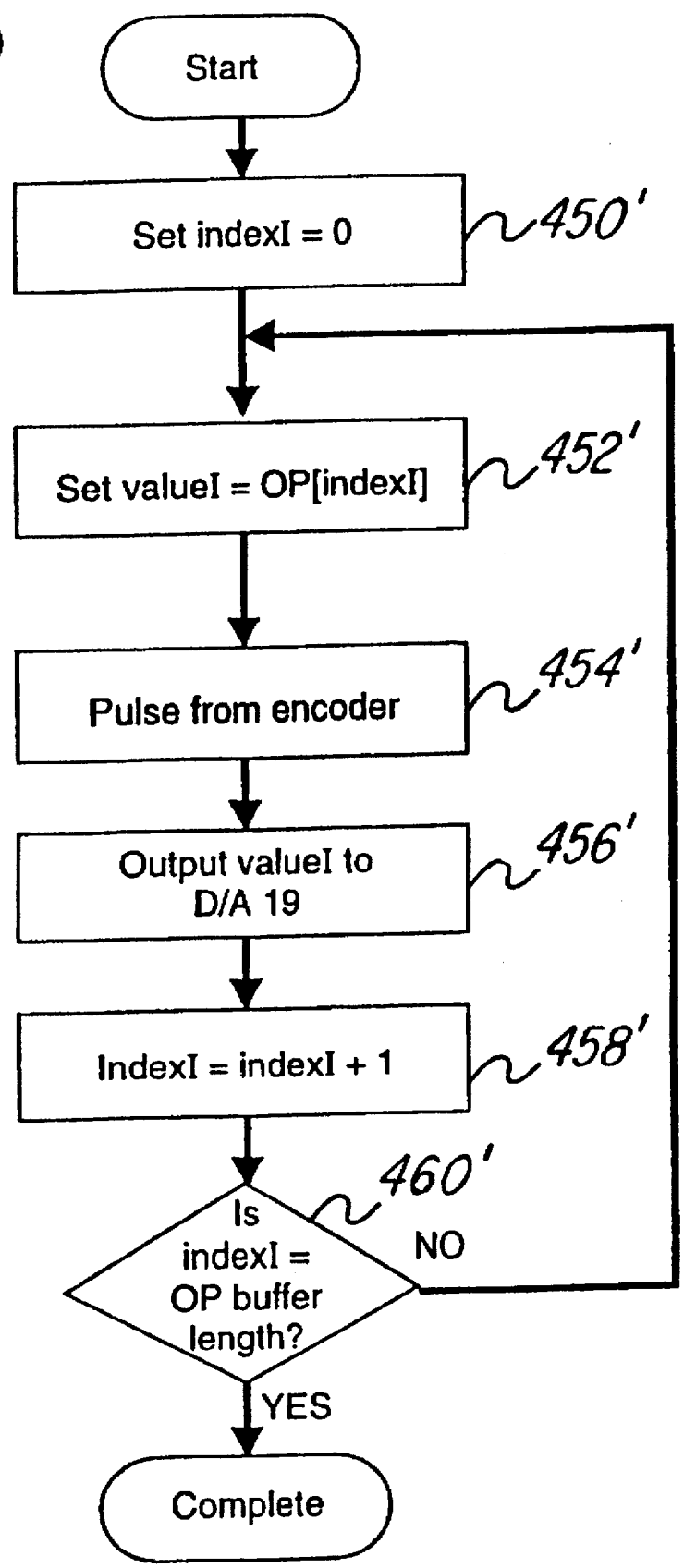
Figure 31:
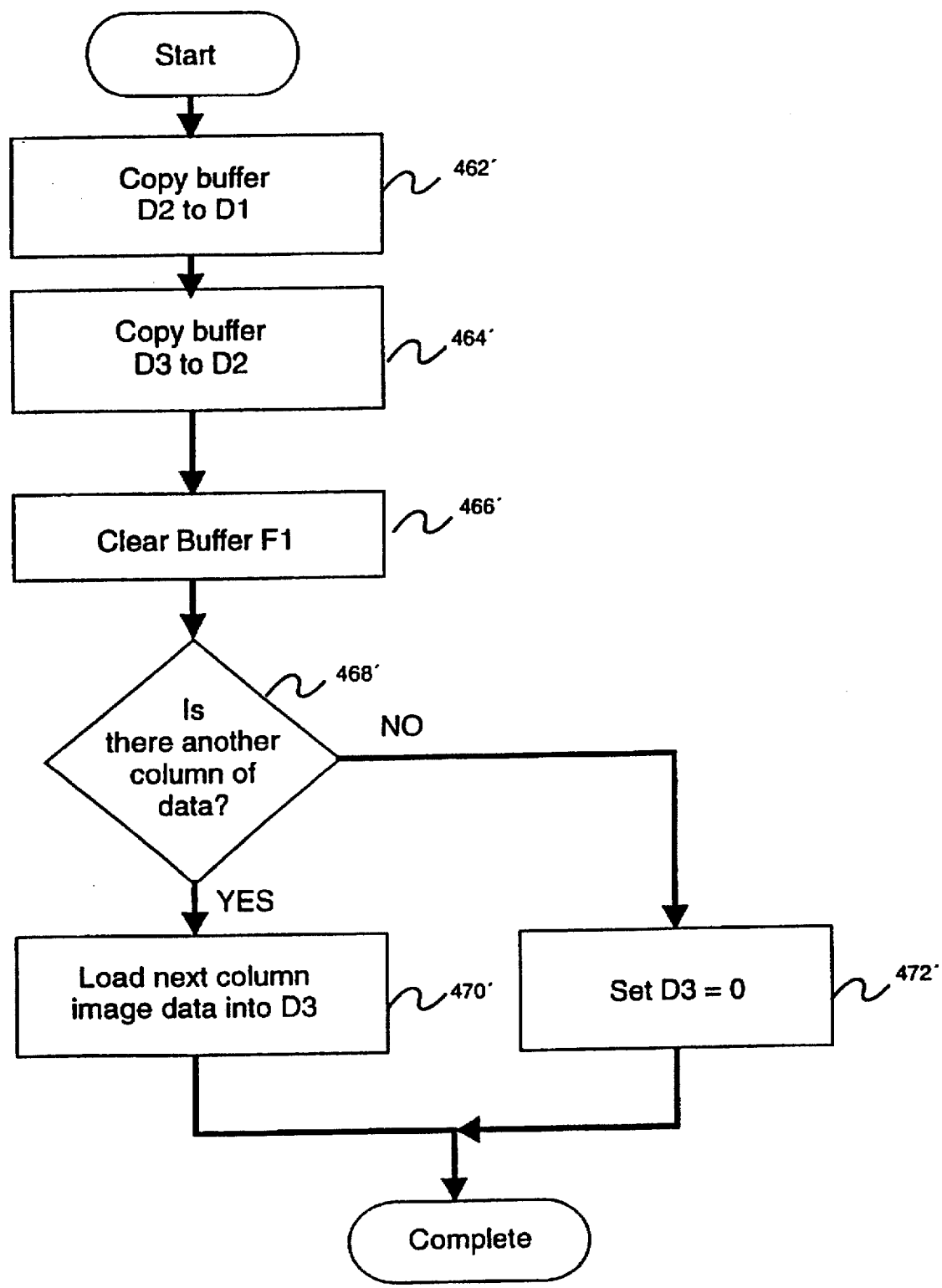
Figure 32:
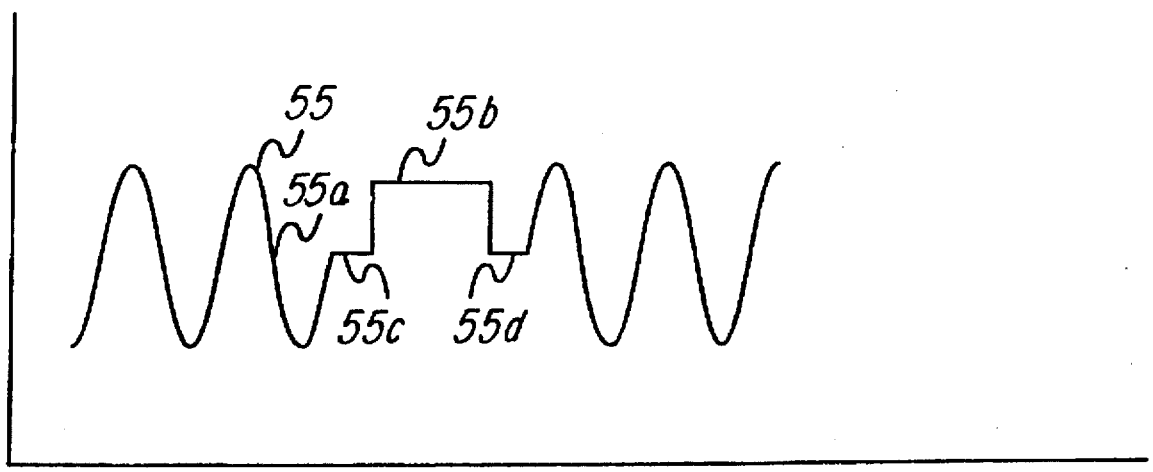

FIG. 19 a flow chart of a set-up routine situated in controller 17;

FIG. 20 is a flow chart of a load image data routine situated in controller 17;

FIG. 21 is a flow charge illustrating a vertical edge scan routine for locating vertical edges in image data;

FIGS. 22A–22B are flow charts which illustrate a horizontal edge method or routine situated in controller 17 for locating horizontal edges in the image to be engraved;

FIG. 23 is a flow chart of a gain method executed by controller 17;

FIG. 24 is a flow chart showing a DC gain routine;

FIG. 25 is another flow chart illustrating a combined routine and method for combining video data with steady state data;

FIG. 26 is a flow chart illustrating a disable routine for disabling and/or replacing a portion of combined image data as desired;

FIGS. 27A–27D are flow charts illustrating a method or routine utilized by controller 17 relative to the disable routine in FIG. 26;

FIG. 28 illustrates a filter routine in accordance with one embodiment of the invention;

FIG. 29 is an output gain/scale and offset routine;

FIG. 30 is an engraving routine;

FIG. 31 is a flow chart which defines or describes an image data routine used herein; and FIG. 32 is an illustration of a waveform which was combined, and/or modified in accordance with the embodiment described relative to FIGS. 18–31.

DETAILED DESCRIPTION OF PREFERRED EMBODIMENT

Figure 1:
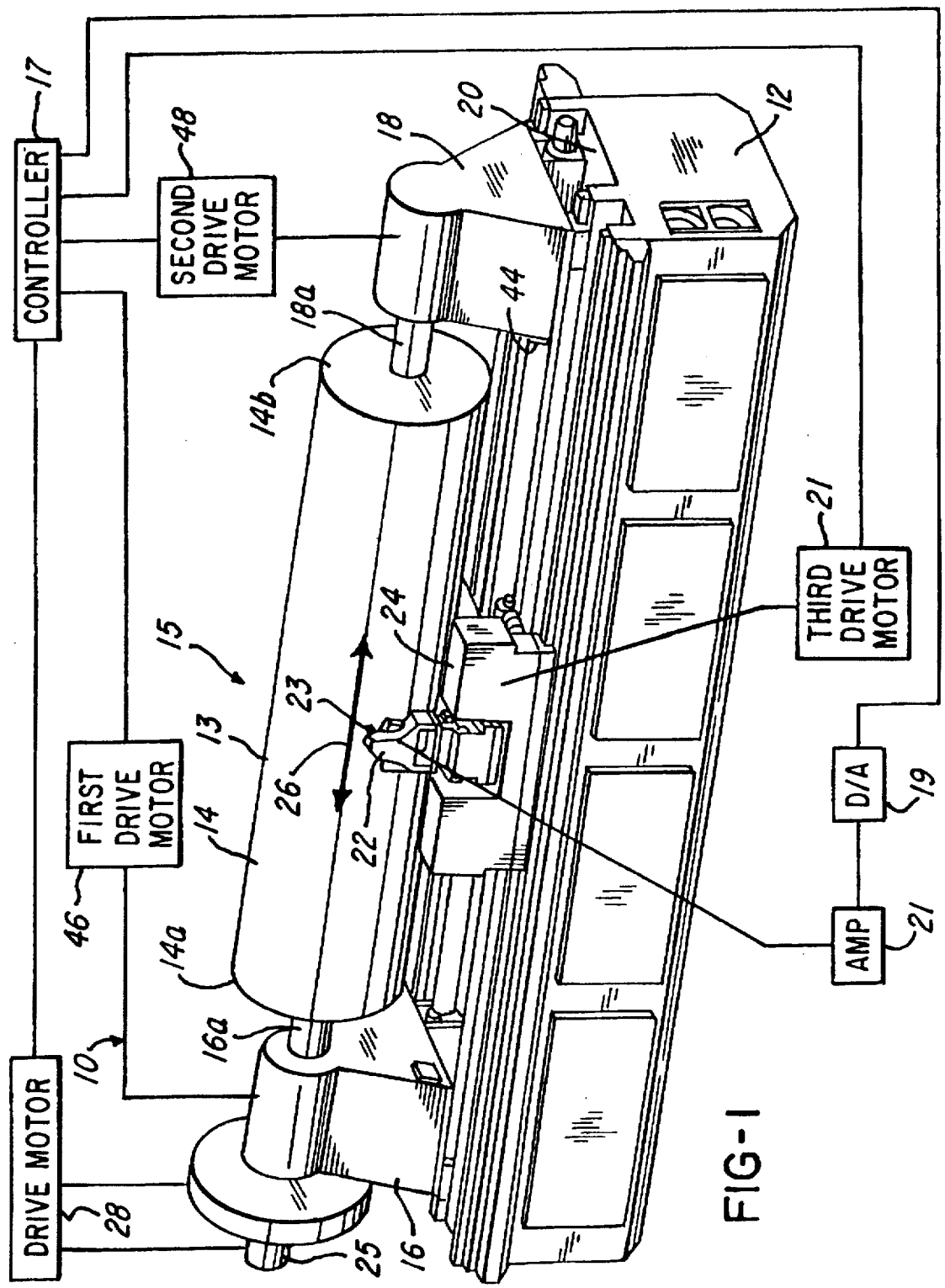
FIG. 1 is a general schematic view of an engraver 10 according to this invention.

FIG. 1 is a general perspective view of a preferred embodiment of an engraver, designated generally as engraver 10. In the embodiment being described, the engraver 10 is a gravure engraver, but the invention may be suitable for use in other engravers, such as laser engraving. The engraver 10 may have a surrounding, slidable safety cabinet structure which is not shown for ease of illustration. Engraver 10 comprises a base 12 having a headstock 16 and a tailstock 18 slidably mounted in track 20 such that the headstock 16 and tailstock 18 can move towards and away from each other. In this regard, engraver 10 comprises a plurality of linear actuators or first drive motor means or first drive motor 46 and a second drive motor means or second drive motor 48 which are capable of driving the headstock 16 and tailstock 18, respectively, towards and away from each other. For example, the drive motors may cause the headstock 16 and tailstock 18 to be actuated to a fully retracted position (not shown) or to a cylinder support position shown in FIG. 1.

The drive motors may be selectively energized to cause the headstock 16 and tailstock 18 to be actuated either independently or simultaneously. Although not shown, a single drive motor may be used with a single leadscrew (not shown) having reverse threads on which either end causes the headstock 16 and tailstock 18 to move simultaneously towards and away from each other as the leadscrew is driven. Driving both headstock 16 and tailstock 18 permits cylinders 14 of varying lengths to be loaded by an overhead crane, for example, whose path is perpendicular to the axis of rotation of the cylinder 14. Although not shown, it should be appreciated that a stationary headstock 16 or tailstock 18 may be used with a driven tailstock 16 or headstock 18, respectively.

The headstock 16 and tailstock 18 comprise a first support cone or shaft 16a and a second support cone or shaft 18a, respectively. The support shafts 16a and 18a each comprise a conically shaped end which is suitable for engaging and rotatably supporting cylinder 14 at an engraving station 15 of engraver 10. In this regard, the cylinder 14 comprises a first end 14a and a second end 14b, each having a receiving opening for receiving end 16b and 18b, respectively. The receiving openings in ends 14a and 14b are conically shaped in cross-section so as to matingly receive ends 16b and 18b of cones 16 and 18.

Although not shown, if a shafted cylinder (not shown) was to be engraved, then headstock 16 and tailstock 18 would each include a gripping device or chuck (not shown) for receiving the shafts and also for rotatably supporting the cylinder 14 at the engraving station 15.

The engraver 10 also comprises an engraving head 22 having an engraving device, such as a cutting tool or stylus 23 for engraving a surface 13 of cylinder 14. In the embodiment being described, the engraving device 23 preferably has a diamond stylus; however, it should be appreciated that the invention may be used with other types of engraving devices, including, for example, laser engraving devices.

The engraving head 22 is slidably mounted on a carriage 24 such that a third drive means or third drive motor 21 can drive the engraving head 22 towards and away from the surface 13 of cylinder 14 in a direction which is generally radial with respect to the rotational axis of cylinder 14. The carriage 24 is also slidably mounted on base 12 such that it traverses the entire surface 13 of cylinder 14 in the direction of double arrow 26 in FIG. 1, which is generally parallel to the axis of the cylinder 14. The engraver 10 also comprises a lead screw (not shown) and drive motors (not shown) for causing the carriage 24 to move in the direction of double arrow 26. The engraving head 22, carriage 24 and transverse movement thereof is similar to that shown in Ser. Nos. 08/038,679, U.S. Pat. No. 5,438,422; 08/022,127, U.S. Pat. No. 5,424,845; and 08/023,060, U.S. Pat. No. 5,329,215, which are assigned to the same assignee as the present invention and which are incorporated herein by reference and made a part hereof.

The engraver 10 also comprises drive means or a drive motor 28 for rotatably driving the support member 16a, cylinder 14, and support member 18a. The drive motor 28 is also operatively coupled to the controller 17, as shown.

The engraver 10 comprises a programmable controller or processor 17 which controls the operation of the engraver 10 and which also controls drive motors 21, 28, 46 and 48 mentioned earlier herein.

Although not shown, the engraver 10 may further comprise a support or support means for supporting the cylinder 14 between headstock 16 and tailstock 18, for example, during loading and unloading.

Controller 17 is also coupled to engraving head 22 and is capable of energizing engraving head 22 to engraver at least one controlled-depth area or cell as carriage 24 traverses surface 13 of cylinder 14 in a manner described later herein.

In accordance with the present invention, an improved engraving method and system is provided for manipulating or modifying input data so as to locate one or more engraved areas 30 (FIG. 2) at a predetermined location 32 in a pattern 34. This invention is particularly useful in defining, for example, a horizontal line or edge 36 (FIG. 2) or vertical line or edge 36a (FIG. 3). For ease of illustration, the horizontal edge 36a, as viewed in FIG. 2, is assumed to be generally parallel with an axis of rotation of cylinder 14.

Figure 2:
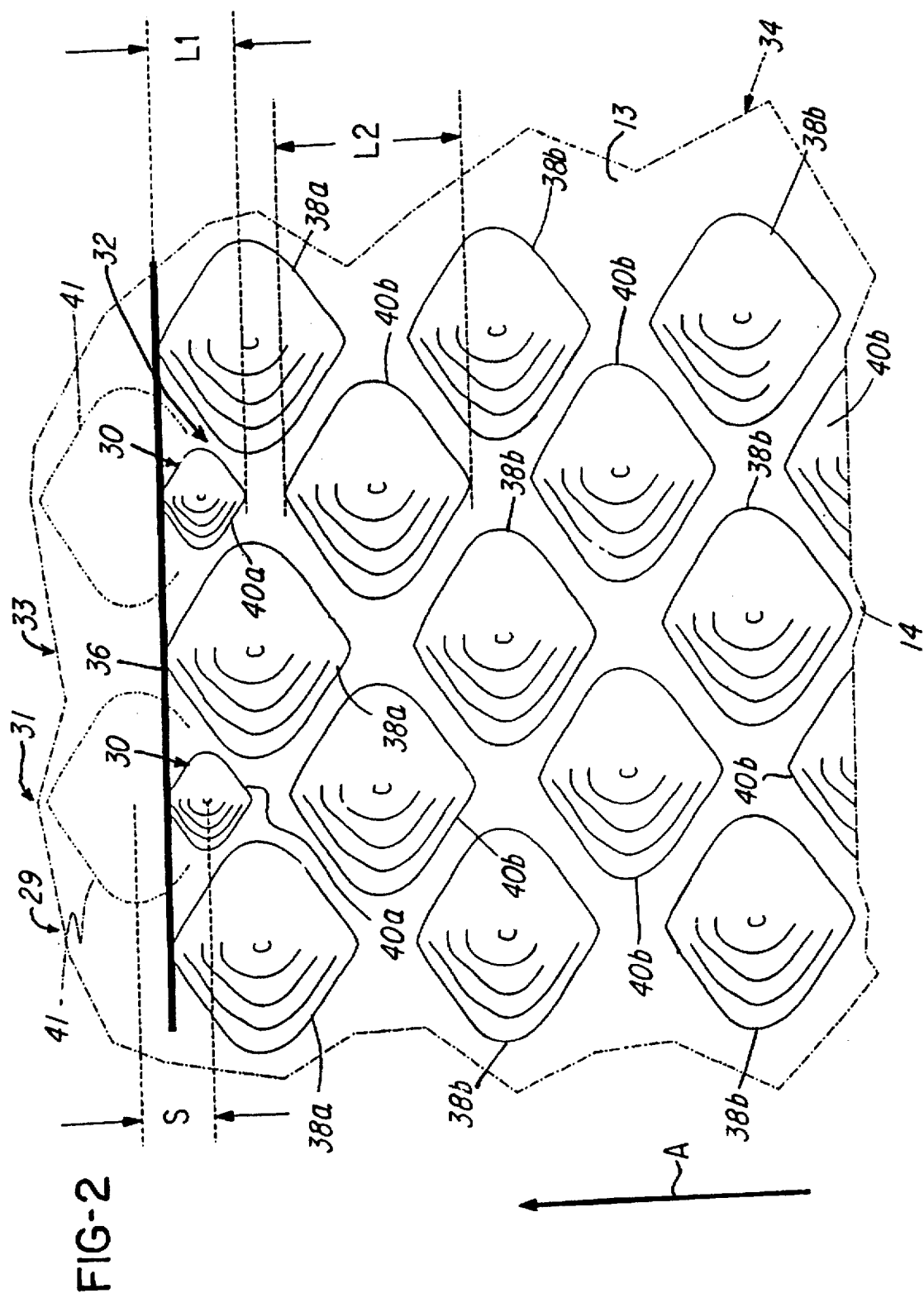
FIG. 2 is a partly broken away view of a pattern comprising a plurality of engraving areas and also illustrating two engraving areas which have been shifted and compressed to facilitate defining an edge or line 36.
Figure 3:
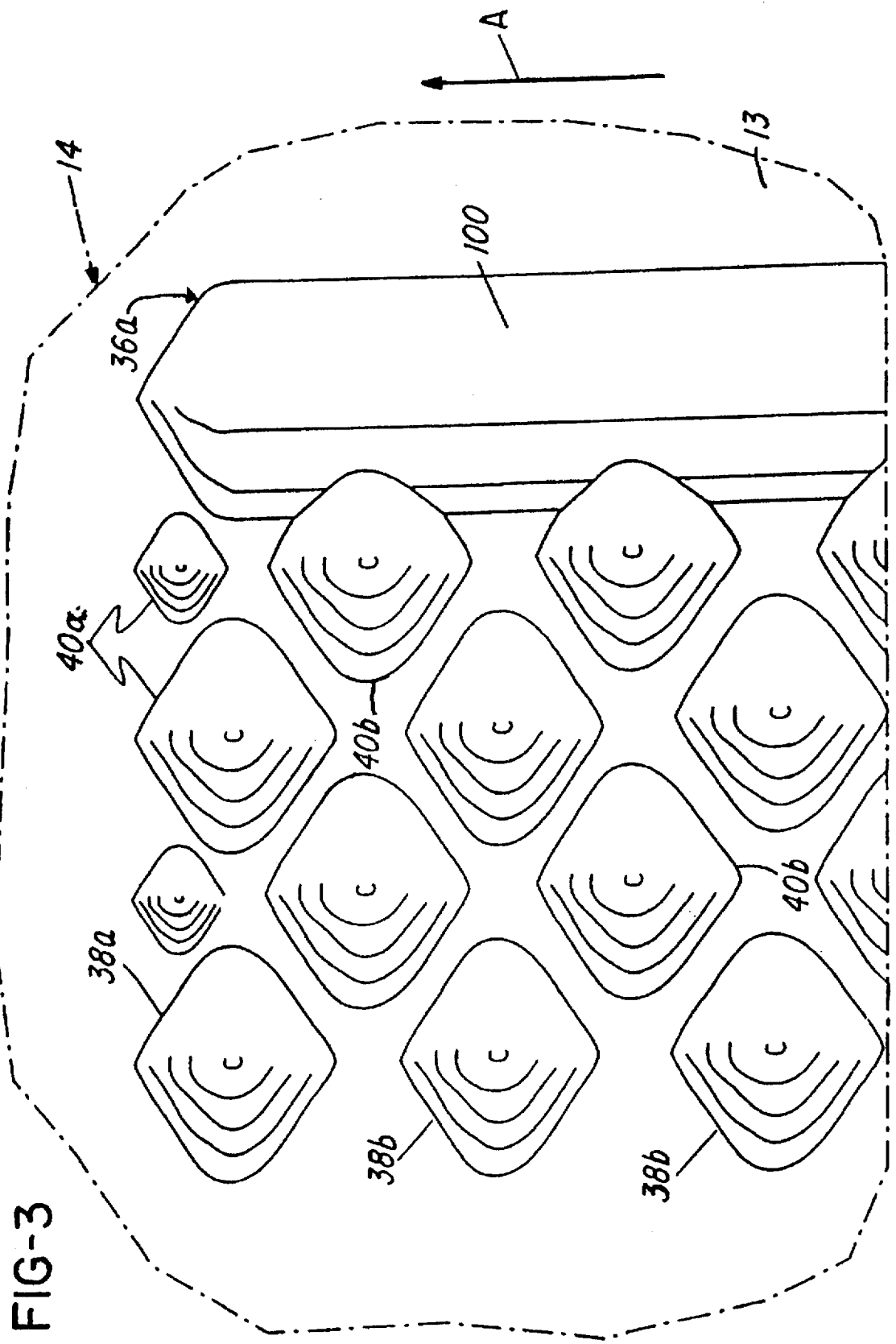

As illustrated in FIG. 2, improved edge definition may be obtained for a pattern of engraved areas 38a, 38b, 40a and 40b in surface 13 of cylinder 14 (FIG. 1). It should be appreciated that FIG. 2 illustrates only a portion of surface 13 of cylinder 14 which is rotating about its cylindrical axis to produce a surface motion or rotation indicated by arrow A in FIG. 2. As illustrated in FIG. 2, the edge or line 36 is defined by engraved areas 38a and 40a. In general, the engraved areas 38a, 38b, 40a and 40b are arranged in a series of nested columns, each having a lead cavity 38a or 40a positioned with its leading edge in alignment with the line or edge 36. It will be appreciated that adjacent columns of cavities may be produced by oscillating the engraving stylus 23 into engraving contact with cylinder 14 during successive helical or cylindrical passes thereof.

The engraver 10 may produce the engraved pattern 34 by commencing to engrave a series of engraved areas along a column 29 each time the edge 36 transits past the engraving stylus 23 on engraving head 22 and continuing until the beginning of another column, such as column 31 in FIG. 2.

Sharp, edge or line pattern definition in a pattern is produced in accordance with this invention by adjusting, modifying or engraving an engraved area, such as area 30 in FIG. 2, to a predetermined dimension as may be required by the pattern being engraved. For example, sharp edge definition is produced in accordance with this invention by compressing and shifting the lead cavities in alternate cavity columns. Thus, lead cavities 38a are engraved in normal fashion, while lead cavities 40a are compressed and shifted. For comparison purposes, FIG. 2 illustrates in phantom lines, prior art cavities 41 corresponding to compressed and shifted areas 40a of the present invention. It will be seen that the center of each lead area 40a is shifted in the engraving direction (i.e., opposite the direction of the arrow A) a distance S. Note that lead cavities 40a are compressed so as to have a length L1 in the engraving direction, while the corresponding length for a non-compressed and shifted cavity is L2.

In general, features of this invention are achieved by analyzing input data associated with one or more of the engraved areas 38a, 38b, 40a, 40b, which make up the pattern 34. The data is analyzed to identify one or more engraved areas or cells which will be modified and also to analyze the pattern 34 prior to engraving such that the dimension or location of one or more of the engraved areas in the pattern 34 may be modified or adjusted.

If it is desired to modify a characteristic, dimension and/or location of one or more of the engraved areas which make up pattern 34, then the data associated with the area may be modified or adjusted as described later herein. Controller 17 then energizes engraving head 22 to engrave the engraved area in accordance with the modified data so as to cause the engraved area to be dimensioned or located as desired in the pattern 34.

FIG. 4 illustrates waveforms for control signals which may be used for engraving a pattern of cavities of the type illustrated in FIG. 2. Preferably, three signals are provided. These signals are combined to control or drive the engraving device of engraving head 22 such that it engraves the cells 38a, 38b, 40a and 40b in a manner which will define the desired pattern 34. The three signals are a steady state oscillation signal 42, a video drive signal 44 and a cavity shaping signal 46. It should be appreciated that the video drive signal 44 comprises the video data information associated with the image (not shown) to be engraved on surface 13 of cylinder 14. The steady state oscillation signal 42 causes radial oscillation of the engraving stylus 23 at a frequency which produces a nesting of engraved areas engraved during successive rotations of cylinder 14.

Video drive signal 44 is added to steady state oscillation signal 42 to generate a first drive signal which controls the movement of the engraving device 23 at all times except during engraving of the engraved areas 40a. Video drive signal 42 has a step 42a which connects a non-engraved portion 42b and an engraved portion 42c. When the portion 42b is added to steady state oscillation signal 42, the engraving device 23 oscillates out of contact with surface 13 of cylinder 14. Engraving is performed when video drive signal 44 transitions to portion 44c.

FIG. 5 illustrates the response of the engraving device 23 to a combined signal 48 of FIG. 2. A profile line 48 represents the motion of a tip of the engraving device 23 relative to surface 13 of cylinder 14. When the portion 44b of video drive signal 44 is added to steady state oscillation signal 42, the engraving stylus follows profile portion 48a where it is out of contact with surface 13 of cylinder 14. When the video drive signal 44 is at portion 44c and is combined with steady state oscillation 42, profile line 46 transitions to the line portion 46b where the stylus periodically engraves engraved areas 38a, 38b, and 40b. When cylinder 14 is being engraved for printing of copy which comprises the line or edge 36 (FIG. 2), then video drive signal 44 shifts from level 44b to level 44c for each white/black transition and from level 44c to level 44b for each black/white transition. In the case where cylinder 14 which is being engraved for printing of multiple tones or grey levels, video drive signal 44 will be stepped between a series of different voltages.

When it is desired to engrave areas 40a, then engraver controller 17 temporarily switches off signal 42 and creates a second stylus drive signal by combining shaping signal 46 to video drive signal 44. The shaping signal 46 has a profile which, when added to portion 44c of signal 44, causes the engraving device 34 to follow the portion 48c of profile 48. As illustrated in FIG. 4, shaping signal 46 has a dip or minimum point 46a which is delayed by a time T from a corresponding dip or minimum point 42a in signal 42. This time T is directly proportional to the distance S of FIG. 2 and represents the distance which the area, such as phantom cell 41 in FIG. 2, has been repositioned or shifted.

Notice in FIG. 5 that the length L1 represents the length which shaping signal 46 caused cell 40a to be compressed from an original length, such as length L2. It should be appreciated, however, that shaping signal 46 may comprise any suitable or desired form as may be required by the dimension, shape or area of the engraved area, such as engraved area 40a, to be engraved in pattern 34 (FIG. 2).

The profile of shaping signal 46 may be determined by simply drawing the desired engraving stylus profile line portion 48c, adding an offset for the video drive signal 44 and making a conversion to the time domain. It will be appreciated that there may be considerable variation in the size, arrangement and/or spacing of engraved areas 38a, 38b, 40a, and 40b in that this may effect the modification, arrangement, shifting and/or compression of one or more of the engraved areas. Accordingly, it is desirable to establish a plurality of shaping signals 46 from which to choose and to store digitized representations of these profiles in an appropriate non-volatile memory. This may be accomplished in accordance with the method illustrated in FIGS. 6–17.

FIGS. 6–17 illustrate flow charts for modifying image data associated with one or more of the engraved areas which make up pattern 34 (FIG. 1) in order to alter, change or eliminate a characteristic dimension or location of the area to, for example, define edge 36 (FIG. 2) and edge 36a (FIG. 3).

Referring now to FIGS. 6–17, a first embodiment is shown comprising a method or routine for identifying and processing data for an engraved area in order to shift the location if that area from a first location a distance L1 to another location where the pattern 34 is engraved.

FIG. 6 illustrates a method or routine for modifying, shifting and/or relocating at least one of the engraved areas, such as engraved area 40a (FIG. 2). As illustrated in FIG. 6, the routine starts at block 199 by setting up a plurality of buffers D1, D2, D3, F1 and OP in memory of controller 17. These buffers are used by the routines, procedures and methods described herein and are set up in accordance with the procedure described below relative to FIG. 7.

At block 200, image data associated with an image (not shown) to be engraved is loaded into the data buffers D1, D2, D3 in controller 17 in accordance with the procedure described below relative to FIG. 8. In the embodiment being described, each engraved area, cell of cavity is represented by four data samples of one byte. The one byte samples represent density values for the engraved area and range from zero to 255, with 255 being the darkest tone or density. Each data buffer D1, D2 and D3 is loaded with a column of data for a column, such as column 31 in FIG. 2, of areas to be engraved. For example, data buffer D2 is loaded with image data corresponding to column 31 (FIG. 2) while data buffers D1 and D3 are loaded with image data corresponding to columns 29 and 33, respectively.

Figure 9:
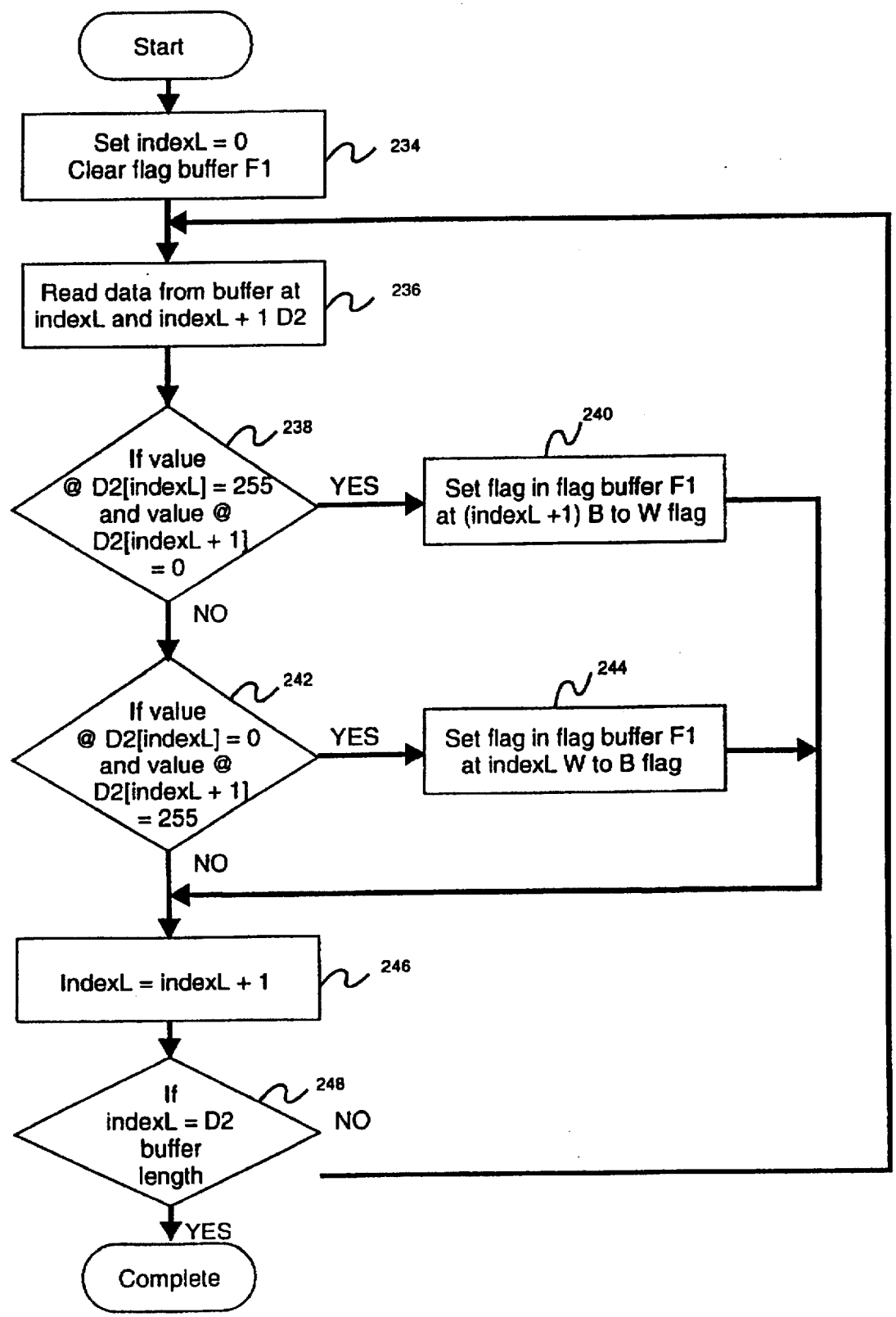
FIG. 9 is a flow chart of a scan routine performed by controller 17.

At block 202, controller 17 comprises a scanner or means for performing a scan routine for scanning data buffer D2 in order to determine the location of a line or edge in the image to be engraved, such as edge 36 (FIG. 2), by examining black/white and white/black transitions. The scanner or scanning means or routine is shown in FIG. 9 which is described in detail below.

The image data is input data buffers D1, D2 and D3 in controller 17 at 4 samples per engraved area. It is desirable to enhance the engraving performed by the engraving head 22 by generating an energizing or output signal to engraving head 22 which represents more samples per engraved area. In this embodiment, it has been found that 32 samples of output data. This feature is achieved by reproducing the input data samples a plurality of times which is set at eight. This is achieved by the procedure shown in FIG. 10 and described later herein.

At block 204, the image data located in data buffer D2 is copied into an output buffer OP in controller 17. The value represented by the 32 bits ranges from minus 2 to plus 2 billion. The submethod or subroute associated with blocks 200 and 202 is described below relative to FIGS. 8 and 9, respectively, described later herein.

Figure 11:
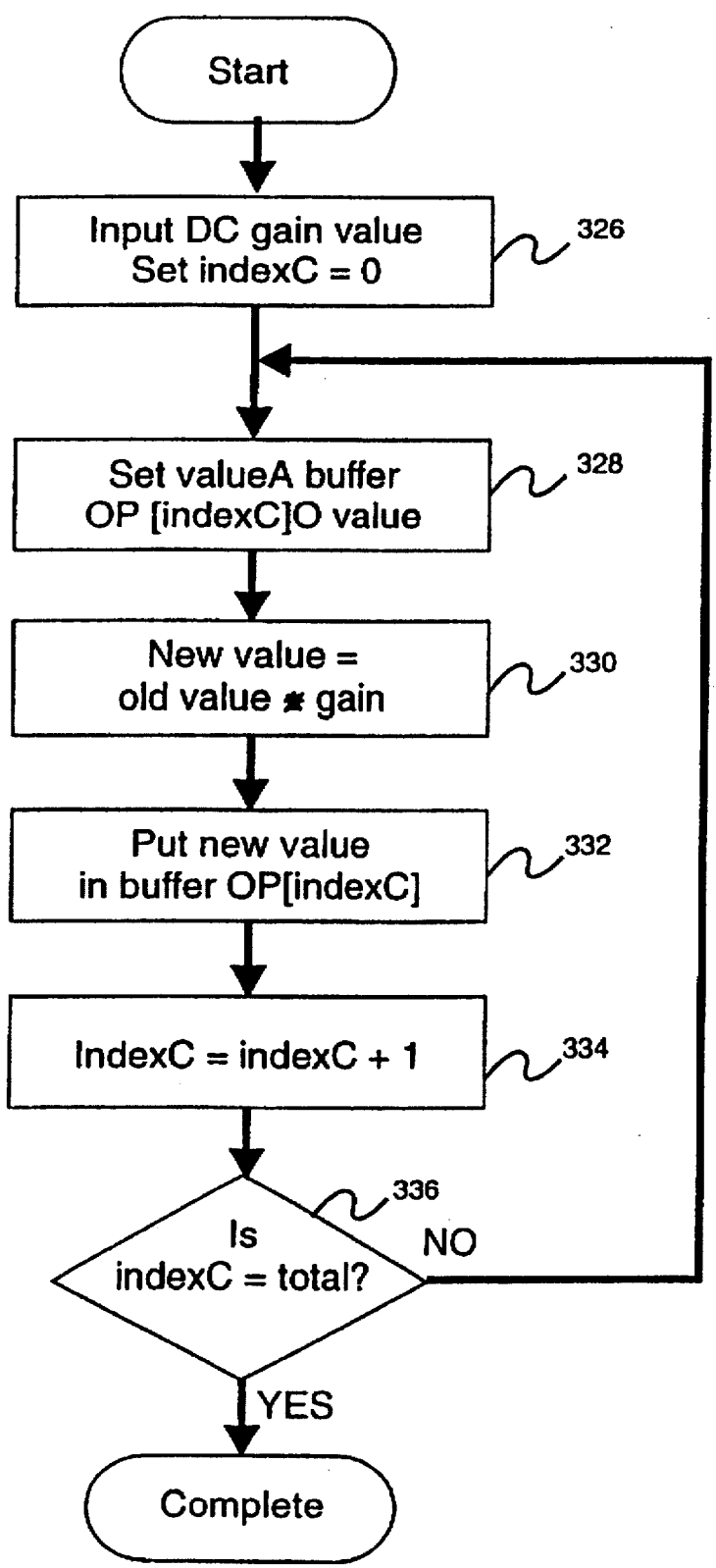
FIG. 11 is a flow chart showing a DC gain routine.

The method continues at block 206 where a DC scaling or gain routine is performed in order to scale the video signal, such as video signal 44 (FIG. 4), which is generated by controller 17. This procedure for scaling is shown in FIG. 11 which is described later herein.

At block 208 (FIG. 12) an AC signal, such as steady state signal 42 in FIG. 4, which was generated by controller 17 is combined or summed with DC data corresponding to video signal 44 in accordance with the method or routine shown in FIG. 12 and described in detail below. Next, a shift routine described later herein relative to FIG. 13A and 13B, modifies the combined or summed data in order to change a dimension, characteristic or location of an area which is engraved in response to that combined data.

Next, controller 17 comprises a filter or filtering means comprising a filter method (block 212) for combining and modifying the combined data in order to modify the signal to compensate for the response characteristics of engraving head 22.

The method proceeds to block 214 where an output gain and offset means or routine situated in controller 17 is performed in accordance with the routine shown relative to FIG. 15 and described later herein. It should be appreciated that after the filter method (block 212) is performed, it may be desirable to scale the data to a desired oscillation range for head 22. This procedure also applies an offset to the combined data to compensate for a shoe position or other engraving head 22 offsets.

At block 216, a controller 17 comprises means for performing an output procedure. This procedure reads output data from buffer OP to digital-to-analog converter 19 (FIG. 1) which generates an engraving signal which is, in turn, amplified by amplifier 21 and then used to energize engraving head 22.

The numeric values for the output data stored in output buffer OP represent voltage levels which are passed to engraved head 22 using D/A converter 19. It should be appreciated that the combined data in buffer OP corresponds to two columns of data for two columns of areas, such as columns 29 and 31 in FIG. 24, any one or both of which may comprise image data which was modified. Alternatively, it should be appreciated that, although the image data was processed, some or all of that data may remain unmodified so that no shifting of an area to be engraved takes place.

At block 216, controller 17, in turn, energizes engraving head 22 (FIG. 1) to engrave the shifted engraved area.

Thereafter, the method proceeds to decision block 220 where control 17 determines if all original input data corresponding to the image to be engraved has been processed. If it has, then the main routine is complete. If it has not, controller 17 obtains new image data in accordance with an image data routine or means (block 222) situated in controller 17 and then loops back to block 202 as shown. In general, the function of the image data routine is to obtain the next column of data to be processed by the method.

Having described the overall method or procedure employed, the various submethods or subroutines referred to above will now be described in more detail.

The setup buffer procedure will now be described relative to FIG. 7. The procedure starts at block 221 where a number of engraved areas, such as a number of cells, is entered into controller 17. In this embodiment, the number of cells for two revolutions of cylinder 14 are input. At block 223, the data buffers D1, D2, D3 and F1 in memory of controller 17 are set to a predetermined length which in this embodiment is four times the number of cells input at block 221. This enables controller 17 to process four samples of data for each engraved area or cell.

At block 225, the output buffer or length is set to 32 times the number of engraved areas or cells. This facilitates enabling controller 17 to output 32 samples per engraved area or cell output buffer OP to O/A converter 19 (FIG. 1). After the buffers D1, D2, D3, F1 and OP are set up in controller 17, the method returns to block 200 (FIG. 8).

Figure 8:
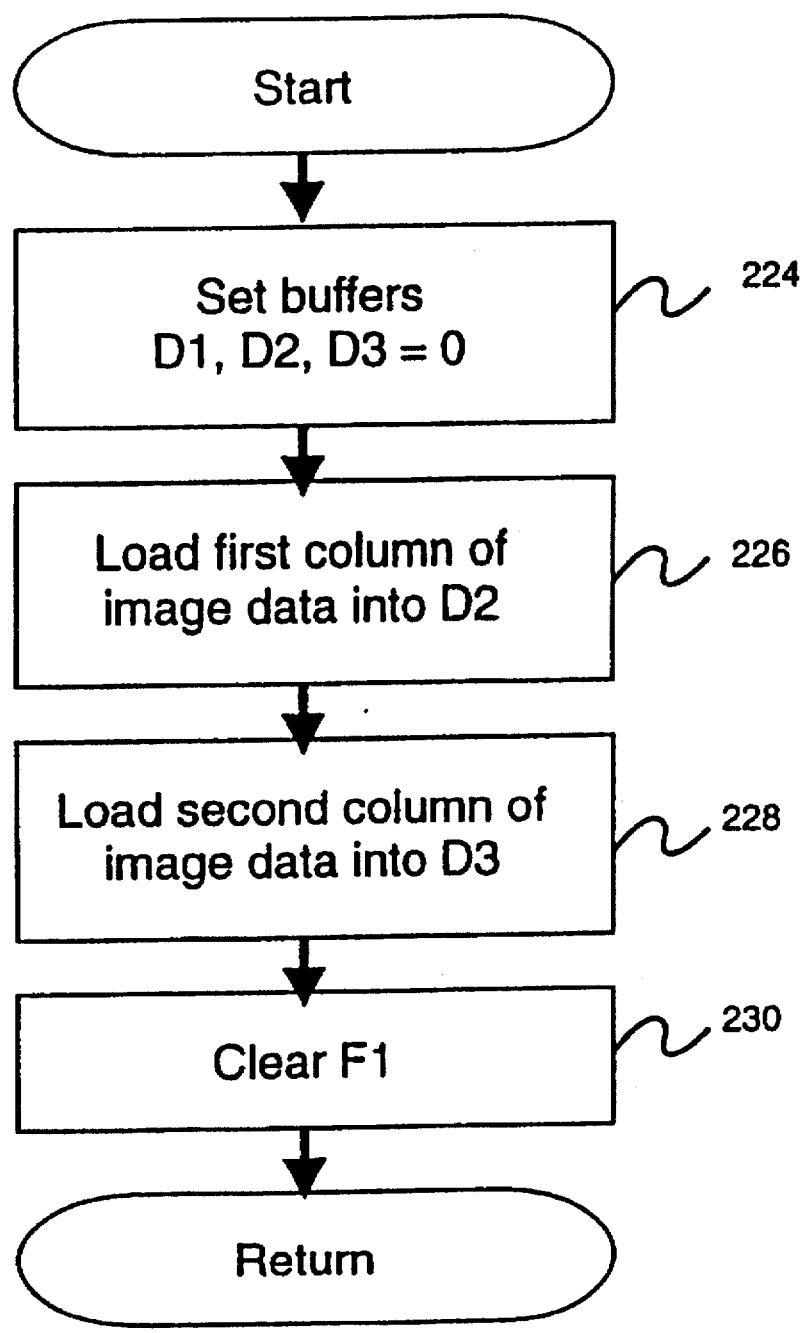
FIG. 8 is a flow chart of a load image data routine situated in controller 17.

As illustrated in FIG. 8, controller 17 performs the load image data routine by setting buffers D1, D2, D3 equal to zero (block 224 in FIG. 8). Next, a first column of image data is loaded into the middle buffer D2 at block 226, and then a second column of image data is loaded into buffer D3 (block 228). The flag buffer F1 is cleared at block 230 and then the procedure returns to block 202 in FIG. 6, whereupon the controller 17 performs the scan method illustrated in FIG. 9.

The scan method begins at block 234 where a size of data buffer D2 is set equal to a predetermined length which, in the embodiment being described, was determined at block 223 in FIG. 7. The method proceeds at block 234 (FIG. 9) where an INDEXL variable is set equal to zero and the flag buffer F1 is cleared. At block 236, image data stored in data buffer locations D2 [INDEXL] and D2 [INDEXL+1] are read by controller 17.

At decision block 238, it is determined if the value stored at position D2 [INDEXL] equals a predetermined threshold (e.g., 255) and if the value stored at position D2 [INDEXL+1] is equal to a second threshold (e.g., zero). The first and second thresholds correspond to a black and white portion, respectively, of the image. If it is, then the method sets a flag in flag buffer F1 at FI [INDEXL+1]. This flag identifies a black-to-white transition. After block 240, the method proceeds to block 246 as shown.

If the decision at decision block 238 is no, then the method proceeds to decision block 242 where it is determined if the value stored at position D2 [INDEXL] equals a predetermined threshold (e.g., 0) equals and if the value stored at position D2 [INDEXL+1] is equal to a second threshold (e.g., 255). The first and second thresholds correspond to a white-to-black transition. If the decision at block 242 is yes, then the flag in flag buffer F1 at FI [INDEXL] is set. If the decision at decision block 242 is negative, then the method increments INDEXL at block 246 and then proceeds to decision block 248 where it is determined if the INDEXL is equal to the D2 buffer length. If the INDEXL is not equal to the D2 buffer length, then the method loops back to block 236 as shown; otherwise it proceeds to block 204 (FIG. 6).

Thus, it should be appreciated that the scan routine illustrated in FIG. 9 identifies and locates the white-to-black and black-to-white transitions. Once these transitions are located, the data in data buffer D2 is copied by controller 17 into output buffer OP in accordance with the routine shown in FIG. 10.

Figure 10:
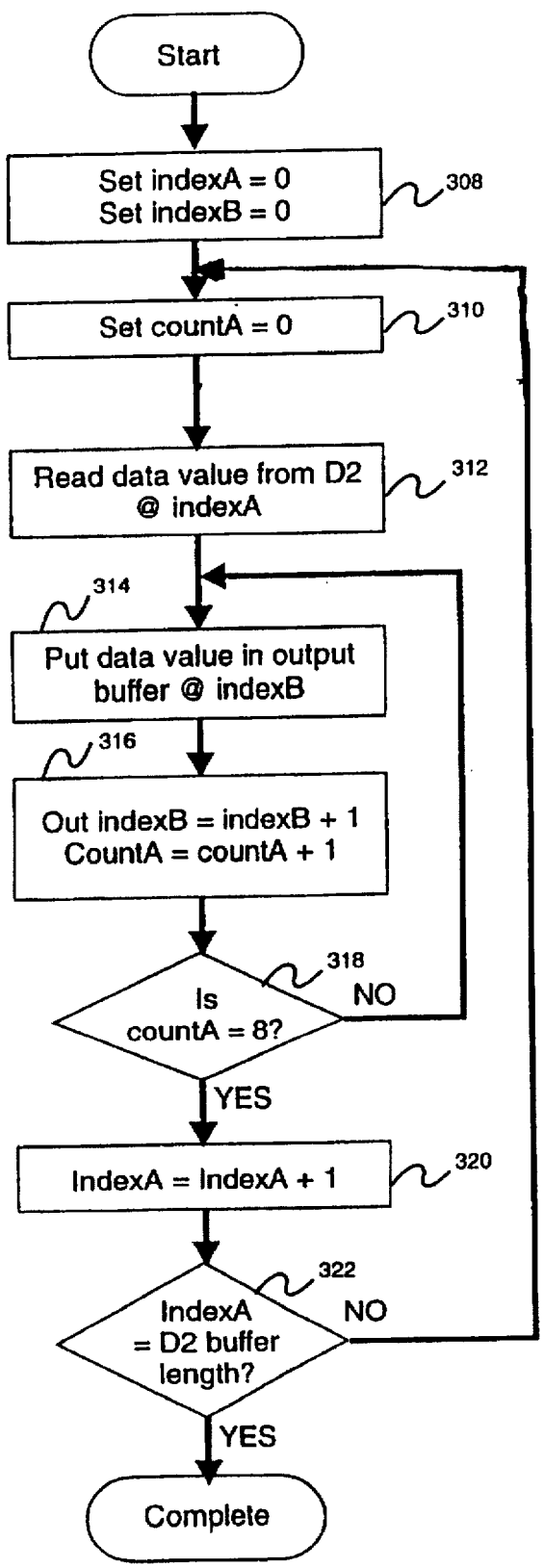
FIG. 10 is a flow chart of a gain method executed by controller 17.

Referring now to FIG. 10, controller 17 processes the image data in buffer D2. Initially, an INDEXA is set equal to zero and INDEXB is also set equal to zero at block 308. At block 310, COUNTA is set equal to zero.

The method proceeds to block 312 where an image data value in the memory of controller 17 located at D2 [INDEXA] is read by controller 17. That data value is loaded into output buffer OP in controller 17 at the OP [INDEXB] location (block 314). At block 316, INDEXB is then incremented by one, and COUNTA is incremented by one.

At decision block 318, it is determined if the COUNTA is equal to a predetermined count, such as eight samples, and if it is not, the method loops back to block 314 as shown. If it is equal to eight, then the method proceeds to block 320 where INDEXA is incremented by one. At decision block 322, it is determined if the INDEXA is equal to a length of the D2 buffer. If it is not, then the routine loops back to block 310 where another data value at the D2 [INDEXA] location is read and processed. If the decision at decision block 322 is yes, then the method is complete.

Upon completion of the copy routine illustrated in FIG. 10, the controller 17 proceeds to perform the DC gain routine (block 206 in FIG. 6) which is illustrated in FIG. 11. The gain routine proceeds by inputting a DC gain value to controller 17, and setting an INDEXC variable equal to zero (block 326). The DC gain value is scanned into or otherwise input into controller 17. The routine proceeds to block 328 where a VALUEA from the data buffer OP [INDEXC] is read (block 328). At block 330, a new VALUEB is set equal to VALUEA times a DC gain or scale factor which is generated by controller 17. The new VALUEB is then loaded into the output buffer OP at location OP[INDEXC] (block 332), and the INDEXC is incremented by one (block 334).

The method proceeds to decision block 336 where it is determined if the INDEXC is equal to the OP buffer length and, if it is not, the method loops back to block 328 as shown. Otherwise, the method is complete.

Figure 12A:
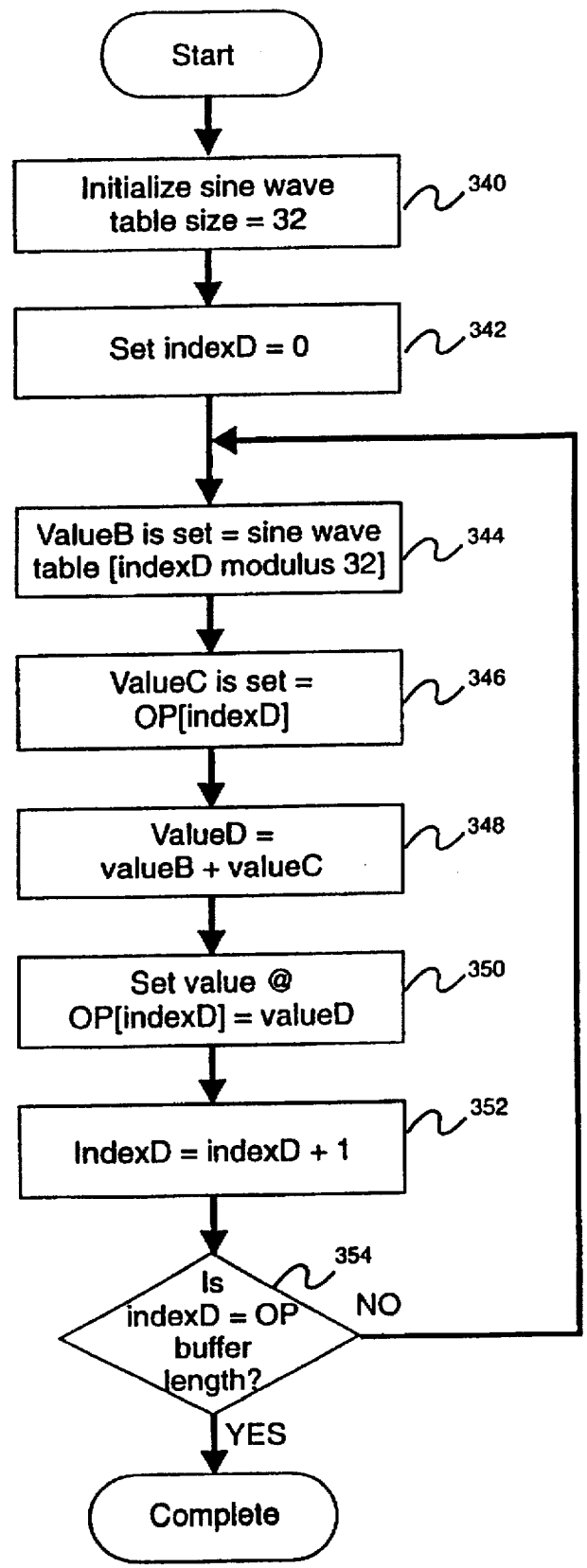
FIG. 12A is another flow chart illustrating a combined routine and method for combining video data with steady state data.

After the DC gain/scale method is performed (block 206 in FIG. 6), controller 17 proceeds to perform the combine routine (block 208 in FIG. 6) which is illustrated and described relative to FIG. 12A. The purpose of the combine method is to apply an AC steady state signal to the image data which was processed as described earlier herein. In this regard, the method begins by initializing a sine wave table 57 size in memory of controller 17 at 32 samples per cycle or per engraved area (block 340). At block 342, an INDEXD is set equal to zero. Thereafter, a sine wave data value 57a VALUEB is read by controller 17 (block 344 in FIG. 12B). The sine wave table 57 in controller 17 comprises a sine waveform one cycle in length with 32 samples in the embodiment being described. A suitable sine wave table is illustrated in FIG. 12A.

The controller 17 utilizes this sine wave table 57 to facilitate superimposing the DC gain data corresponding to signal 44 (FIG. 4) generated by the DC gain routine onto a sine wave, such as the steady state signal 42a, to provide a combined engraving signal (like signal 48 in FIG. 5). At block 346 (FIG. 12A), a VALUEC is set equal to the data value in output buffer OP at location OP [INDEXD]. At block 348, VALUED is set equal to VALUEB from the sine wave table (block 344) plus the data VALUEC which was read at block 346.

The VALUED is loaded into the output buffer at location OP [INDEXD] at block 350 (FIG. 12A) and then the INDEXD is incremented by one (block 352). At decision block 354, it is determined if the INDEXD is equal to the length of the output buffer OP. If it is not, the method loops back to block 344 as shown. If it is equal, then the method is complete and returns to block 210 in FIG. 6.

It should be appreciated that the four samples of image data per engrave area may be represented by signal 44 (FIG. 4). This image data has been combined with the sine wave steady state signal, such as represented by signal 42 in FIG. 4, to provide combined data. This combined data may be represented by signal 48 in FIG. 5, which comprises 32 samples per engraved area.

Figure 13A:
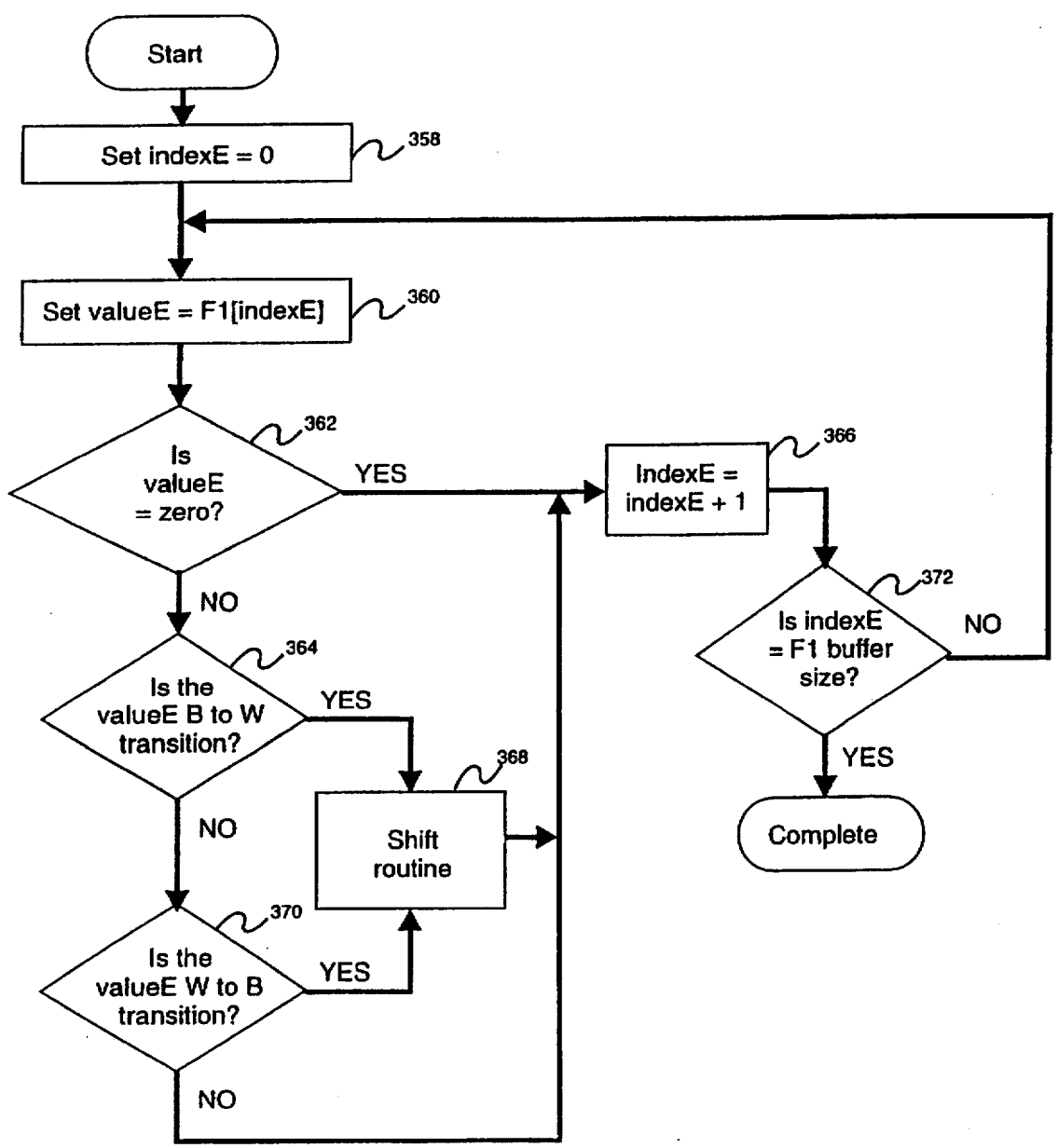
FIGS. 13A–13B are flow charts which illustrate a shift method or routine performed by controller 17.
Figure 13:
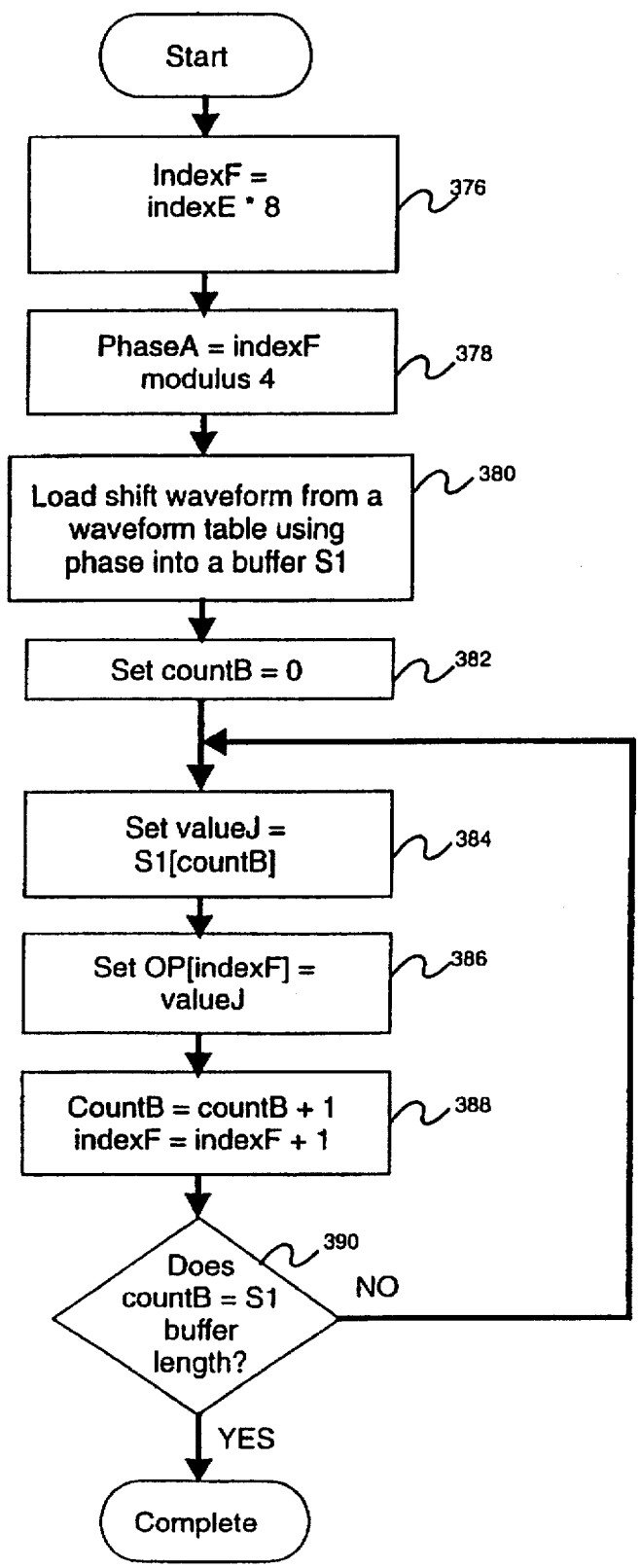
FIG. 13C illustrates a plurality of signals plotted from data in a shift table which is situated in controller 17 and which comprises a plurality of shaping signals suitable for shaping combined signal generated by the routine shown in FIG. 12A.

Once the combine routine is performed by controller 17, the method proceeds to modify the combined data generated so that an engraved area corresponding to that combined will be shifted, for example, the distance S in FIG. 2 using the shift routine (block 210 in FIG. 6) illustrated relative to FIGS. 13A and 13B. As illustrated in FIG. 13A, an INDEXE is set equal to zero (block 358). A VALUEE is set to the value located at flag buffer F1 [INDEXE] (block 360). It is then determined if a VALUEE is equal to zero. If it is not, the method proceeds to decision block 364 where it is determined if the VALUEE represents a black-to-white transition (block 364). If it does not, then the process proceeds to determine (block 370) if the VALUEE represents a white-to-black transition. If the decision at decision block 362 is yes or the decision at block 370 is no, then the process proceeds to increment the INDEXE by one. If the decision at decision blocks 364 and 370 are yes, then the method proceeds (block 368) to modify the output buffer OP data to adjust a position of the area which will be engraved in accordance with the shift routine shown in FIG. 13B.

Thereafter, it proceeds to increment INDEXE by one (block 366). At decision block 372, it is determined if the INDEXE is equal to the length of the F1 buffer. If it does, then the transition method is complete. If it is not, the method loops back to block 60 as shown.

Thus, it should be understood that the method in FIG. 13A facilitates locating edges defined as black-to-white or white-to-black transitions. Once these transitions are known the method may proceed to modify or alter the combined image data to cause the area to be engraved in response to that data to be shifted.

Referring now to FIG. 13B, the shift cell routine is illustrated. This method proceeds by setting an INDEXF equal to INDEXE times 8. It should be appreciated the flag value at F1 [INDEXE] corresponds to a black-to-white or white-to-black transition. The combined data corresponding to this transition is located in output buffer OP at memory location OP [INDEXF].

Figure 13C:
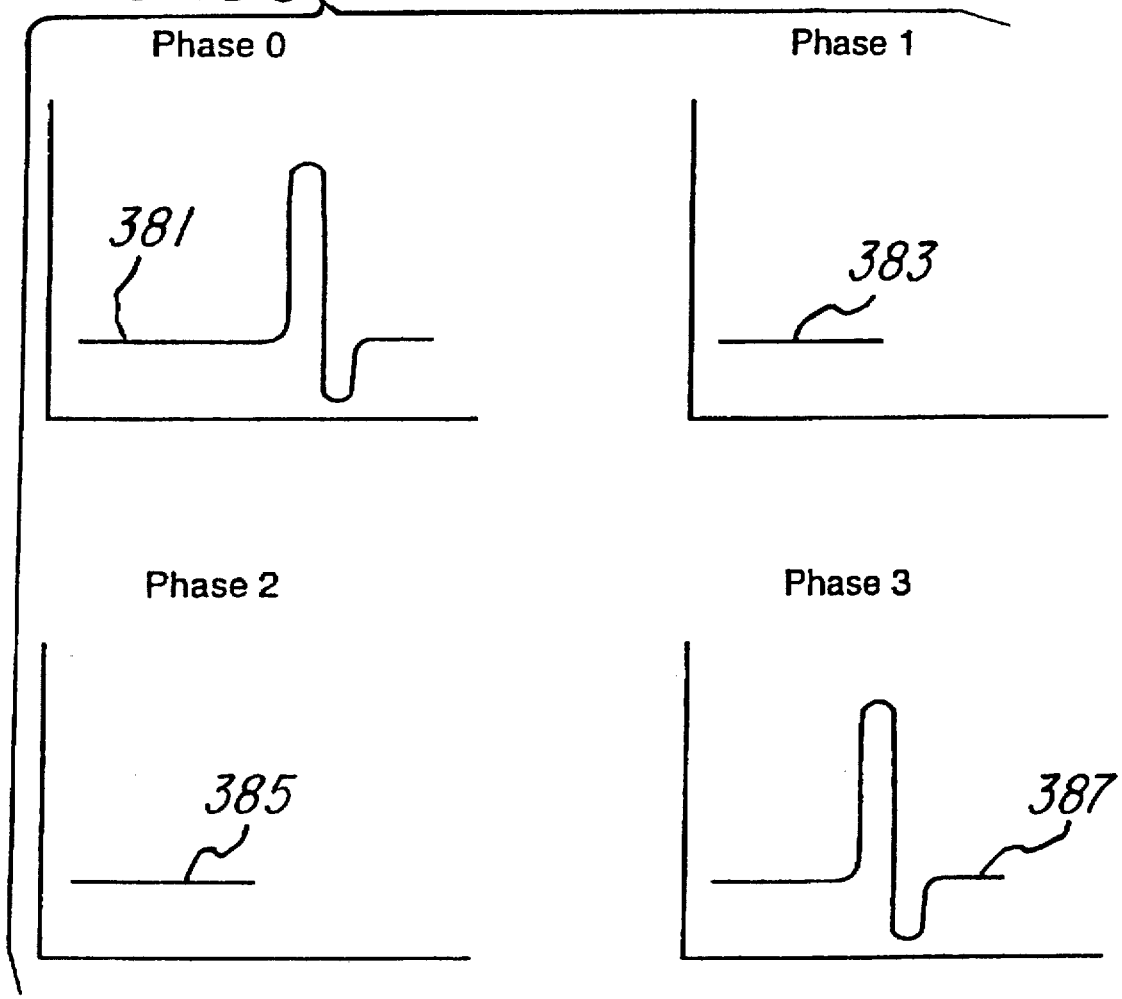

A phase variable, PHASEA, is computed as the INDEXF modulus 4 (block 378). In this embodiment, the Phase A variable represents the position of the transition relative to, or along, the sine wave generated at block 344 (FIG. 12A). This, in turn, facilitates determining where an engraved area, such as in cell 41 (FIG. 2), the transition is located. In this embodiment, there are four phases or samples per sine wave cycle. For each phase, there is a look-up or shift table situated in controller 17 which comprises a plurality of data values. As illustrated in FIG. 13C, waveform plots 381, 383, 385 and 387 are shown. These waveforms 381, 383, 385 and 387 correspond to the data values in each shift table. A representative shift table 381 of shift data waveforms is illustrated in FIG. 13C. The shift waveform from the waveform table is located in controller 17 (block 380). The shift waveform corresponding to the phase value is loaded into a buffer S1 in controller 17. A COUNTB is set equal to zero (block 382), and a VALUEJ is set equal to the value located at a buffer S1 in controller 17 at position buffer S1 [COUNTB] (block 384). At block 386, the VALUEJ is stored in output buffer OP at the OP [INDEXF] location. At block 388, COUNTB is incremented by one, and INDEXF variable is incremented by one. It is then determined if the COUNTB is equal to a length of the S1 buffer at decision block 390. If it is, then the method is complete and returns to block 212 in FIG. 6. If it is not, the method loops back to decision block 384 as shown.

Figure 14:
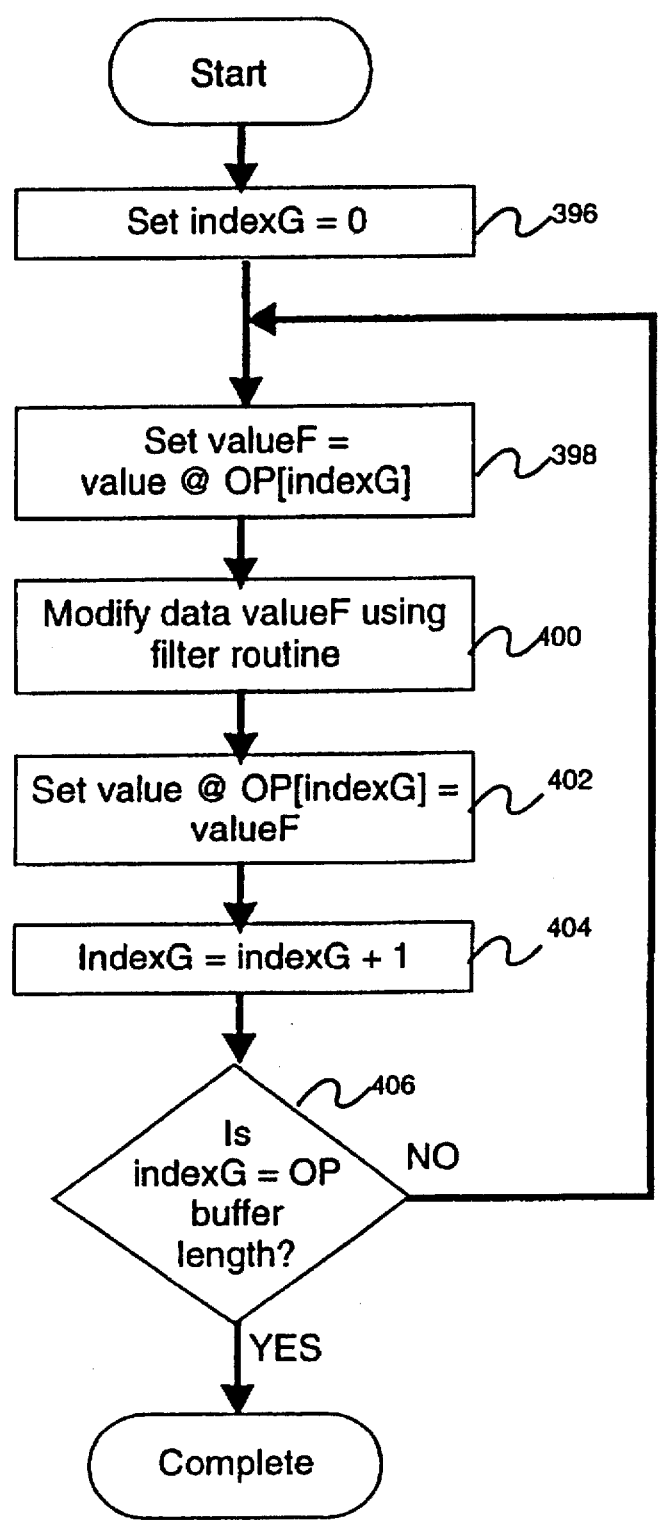
FIG. 14 illustrates a filter routine in accordance with one embodiment of the invention.

After the image data has been processed and any dimension or characteristic of an area to be engraved is modified, adjusted or shifted to achieve a desired engrave pattern (for example, to define an edge or line in an image to be printed by the cylinder) the method proceeds to a filter routine as illustrated in FIG. 14. In this regard, controller 17 comprises a filter or filtering means for filtering combined data after it has been processed as described above.

The filter routine facilitates modifying the frequency content of the processed data so that the engaging head 22 and engraving device 23 respond to engrave the desired pattern. This is necessary because the nature frequency response of engraving head 22 may not produce desired results when excited with a non-filtered signal. The filter routine (FIG. 14) begins at block 396 where an INDEXG is set equal to zero. The method proceeds to block 398 where a VALUEF is set equal to in OP [INDEXG]. The data VALUE F represents a single data value from output buffer OP [INDEXG]. Thus, each data value in output buffer OP is processed. This data VALUEF is then convolved using the filter and procedure described herein.

In the embodiment being described, one suitable filter is an infinite impulse response (IIR) digital filter situated in controller 17, but it should be appreciated that the invention may be practiced with non-digital filters. The IIR filter is an inverse dynamical control filter. The filter is a cascaded, inverse model of the engraving head 22 and a filter with the desired frequency response. The inverse model of the head 22 was obtained by recursive least squares system identification with a white noise excitation of the engraving head 22. The desired frequency response is that of an eighth order real pole filter with all poles placed at 2–15 Khz, depending on desired engraving speed. The resultant filter comprises a digital approximation of a continuous control filter. The convolved value is then stored in output buffer OP at location OP [INDEXG] (block 402).

The INDEXG (FIG. 14) is then incremented by one (block 404). At decision block 406, it is determined if INDEXG is equal to the length of output buffer OP, and if not, the method loops back to block 398 as shown. Otherwise, the method is complete and returns to block 214 (FIG. 6) where an output gain and offset routine is then performed by controller 17.

Figure 15:
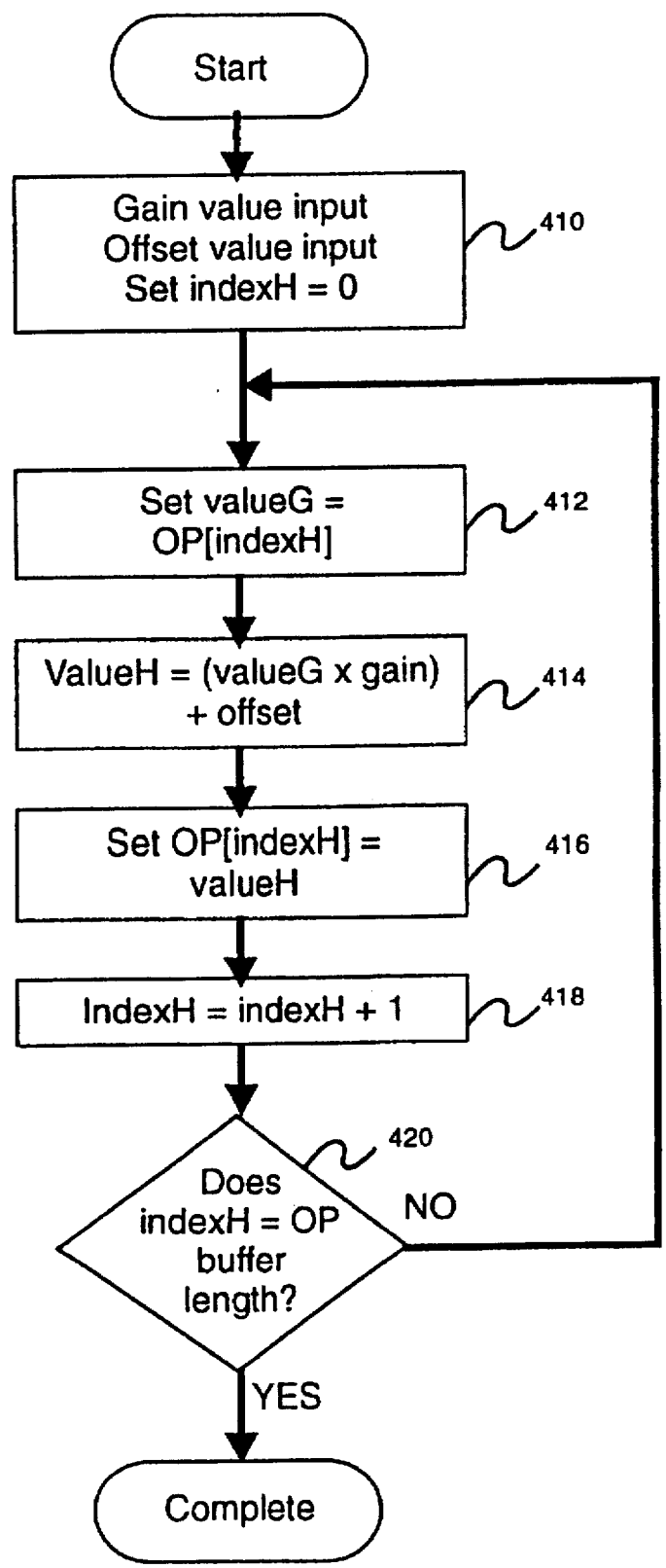
FIG. 15 is a flow chart of an output gain/scale and offset routine.

Referring now to FIG. 15, the output gain and offset procedure begins by inputting a gain factor and an offset into controller 17. An INDEXH is equal to zero. Controller 17 sets a VALUEG equal to the value stored in buffer OP at location OP [INDEXH]. At block 414, VALUEH is determined or calculated by multiplying VALUEG by the gain factor and then adding the offset. In the present embodiment, the gain may vary between 2.0–30.0, and the offset is plus or minus 16.000.

INDEXH is incremented by one (block 418). At block 420, it is determined if the INDEXH is equal to the length of output buffer OP. If it is not, the process loops back to block 412 as shown; otherwise, the process is complete and returns to block 216 (FIG. 6).

Figure 16:
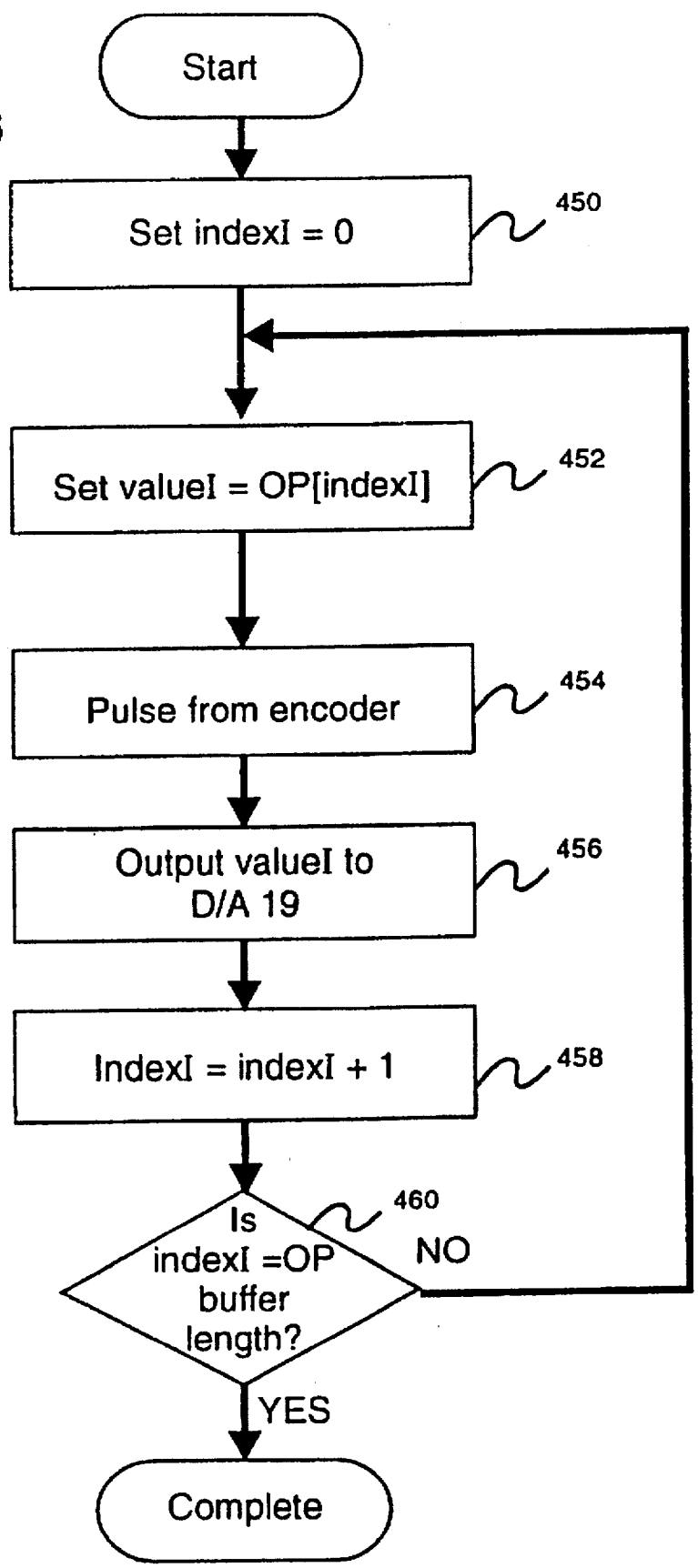
FIG. 16 is a flow chart of an engraving routine.

After the output gain and offset procedure is performed by controller 17, the method proceeds to block 216 where output data for engraving the portion of the image data being processed is generated by controller 17. In this regard, FIG. 16 illustrates a method for outputting output data from output buffer OP. As shown in FIG. 16, the method starts at block 450 where controller 17 sets an INDEXI equal to 0. At block 452, the VALUEI is loaded with the data stored at output buffer OP [INDEXI]. This data corresponds to output data which has been processed as described herein.

At an appropriate time, controller 17 receives a timing pulse from an encoder 25 (FIG. 1) associated with drive motor 28 (block 454 in FIG. 16). In response to the timing pulse, controller 17 outputs the data VALUEI in digital form to D/A converter 19 (FIG. 1). The D/A converter 19 converts the VALUEI data into an analog voltage which is amplified by an amplifier 21 (FIG. 1) and then used to energize engraving head 22 so that engraving can be performed.

Figure 17:
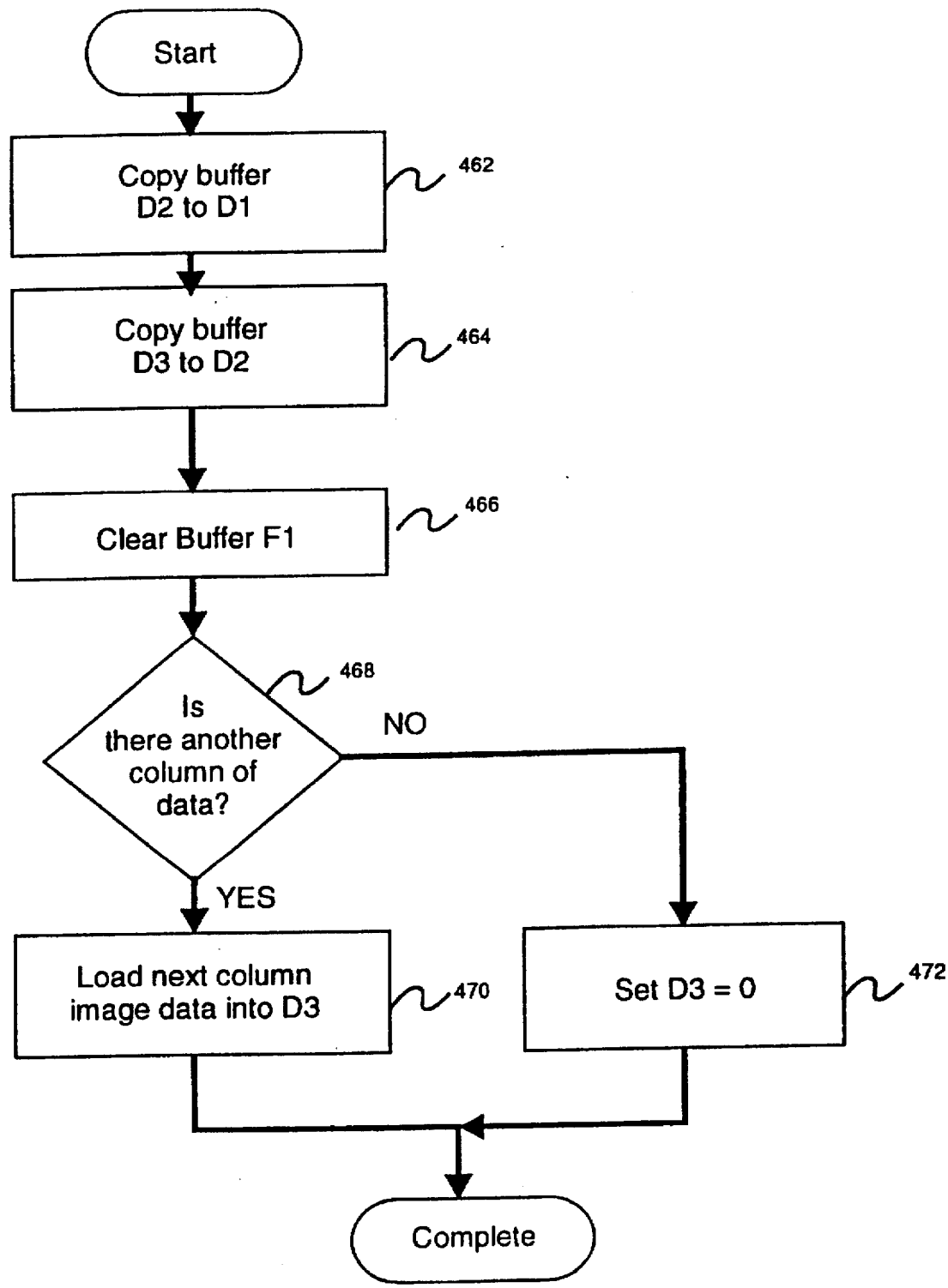
FIG. 17 is a flow chart which defines or describes an image data routine used herein.

As mentioned earlier herein, once all data associated with an image to be engraved has been engraved, then engraving is complete (block 220 in FIG. 6). Otherwise, the next column of input image data to be processed are input or obtained from, for example, external memory in accordance with the image data procedure (block 222). In the embodiment being described, one suitable image data procedure is illustrated in FIG. 17 which begins by copying image data located at buffer D2 into buffer D1 (block 462) and copying image buffer data D3 into buffer D2 (block 464). The flag buffer F1 is cleared (block 466). At decision block 468, controller 17 determines if there is another column of image data to be processed. If there is, the method proceeds to load that next column data into buffer D3 (block 470). If the answer at decision block 468 is no, then the controller 17 clears buffer D3 and the method returns to block 202 in FIG. 6 for further processing. After all input columns of data are processed and the engraving is complete, a pattern 34 (FIG. 2) is engraved on the cylinder 14. The pattern 34 may have at least one engraved area whose associated input data was modified to achieve a desired result, such as defining a horizontal line 36 (FIG. 2).

Advantageously, this procedure facilitates processing image data and locating transitions between engraved and non-engraved areas for purposes of modifying a location of one or more of the engraved areas. This, in turn, facilitates providing a pattern of engraved areas which achieve desired characteristics, such as defined edges and lines.

FIGS. 18–32 illustrate another embodiment of the invention where a characteristic or dimension of one or more areas of an image to be engraved is modified prior to engraving in order to enhance, modify or change a characteristic of the engraved area to facilitate defining a desired engraved pattern. In this illustration, one or more of the areas to be engraved is modified to define or provide an elongated cell or trench 100 (FIG. 3) to facilitate defining a substantially vertical edge or line 35a (FIG. 3).

It should be appreciated that the procedures or methods shown in FIGS. 18–32, which have some of the same procedures or methods as was described above relative to FIGS. 6–17. The procedures or methods which are the same have the same block number, with the addition of a "'" mark added to the numbers used in FIGS. 18–32.

Figure 18:
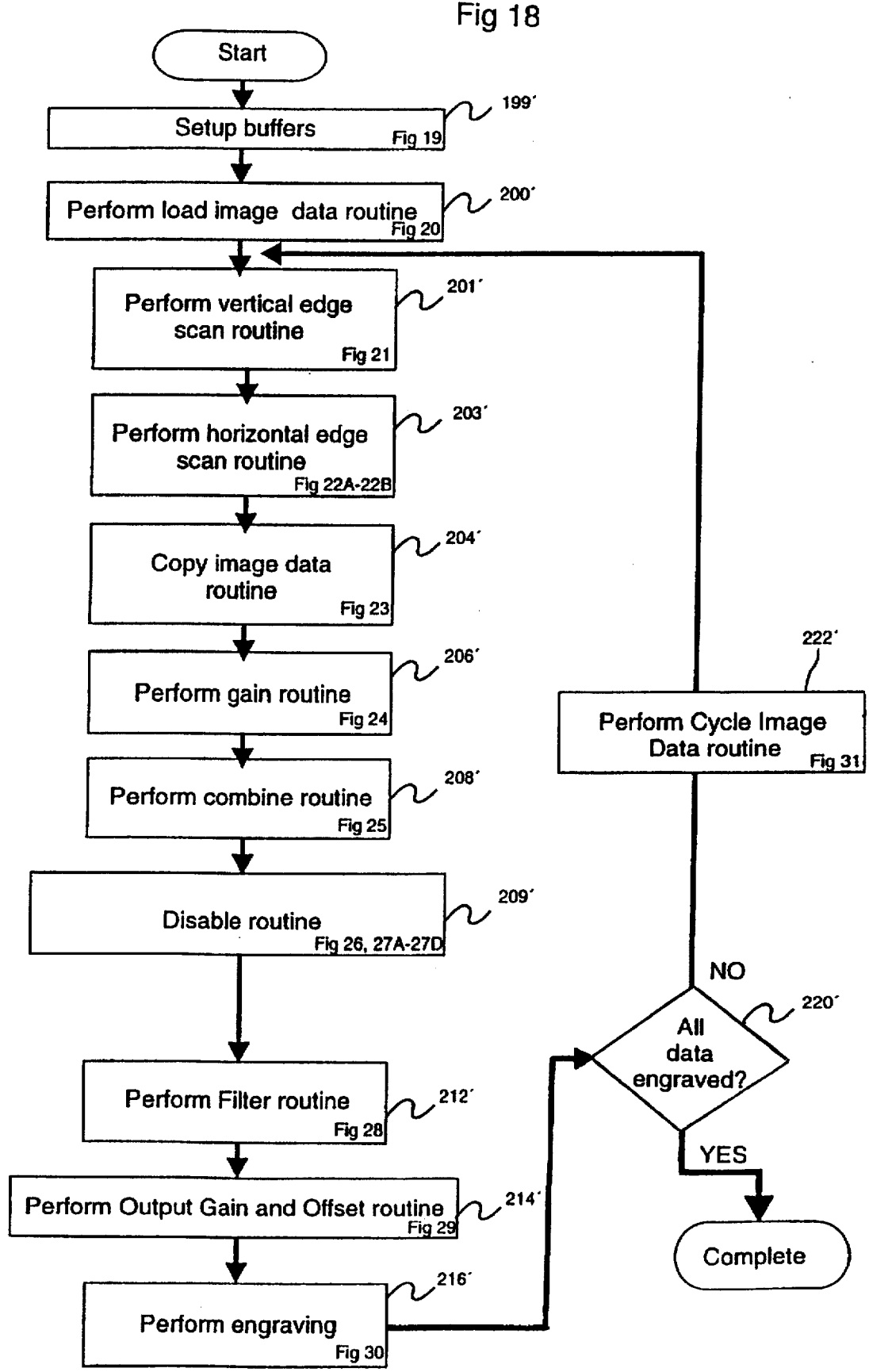
FIG. 18 illustrates a second embodiment of the invention for facilitating defining a vertical edge, such as edge 100 in FIG. 3.

Referring now to FIG. 18, image data is loaded into three buffers D1, D2, and D3 (block 200'). One method for performing this load procedure is illustrated in FIG. 20 which is substantially the same as the procedure described above relative to FIG. 8.

After the data buffers are set and/or loaded with image data for an image to be engraved, a vertical scan routine is performed (block 201') which is described in detail below. Then a horizontal scan routine is performed (block 203').

Image data in the D2 buffer is copied into output buffer OP at block 204' in accordance with the method shown in FIG. 23 and which is substantially the same as the method and procedure described relative to FIG. 10 above. Upon completion of the copying routine, a DC gain or scale routine is performed (block 206') and then a combine routine is performed at block 208'. The DC routine 206' is illustrated in FIG. 24 which is substantially the same as the procedure and method described with the embodiment described above relative to FIG. 11.

The combine routine 208' is illustrated in FIG. 25 and comprises the same method and procedure shown in FIG. 12A and described above. The method proceeds to a disable AC on vertical edges (block 209') and which is described relative to FIGS. 26 and 27A–27D described below. The procedure continues to block 212' (FIG. 18) where controller 17 performs the filter routine. It should be appreciated that the filter routine 15 shown in FIG. 29 is substantially the same as the filtering procedure shown in FIG. 14 and described earlier herein.

As with the embodiment described earlier herein, this method proceeds to perform an output gain and offset routine (block 214'), and thereafter, engraving (block 216'). The output gain and offset routine 214' is substantially the same as the output gain and offset routine described above relative to FIG. 15. Likewise, the engraving step 216' is shown in FIG. 30 and is substantially the same as the method shown in FIG. 16 and described earlier herein.

It is determined at block 220' if all data associated with an image has been processed. If it has, then the method is complete. If it has not, the method proceeds to block 222' where more image data routine is obtained and processed. It should be appreciated that the image data method is shown in FIG. 31 and is the same as that shown in FIG. 17 described earlier herein. In the embodiment being described, the procedure then loops back to block 201' as shown.

Referring now to FIG. 21, the vertical scan routine is shown. This procedure begins by setting an INDEXN equal to zero (block 432'). At decision block 434', it is determined if the value stored at buffer D2 location D2 [INDEXN] is less than a predetermined threshold, which in this embodiment is set at one. If it is, then the INDEXN is incremented by one (block 438'). Thereafter, it is determined at block 440' whether the INDEXN is equal to a length of buffer D2. If it is not, then the method loops back to decision block 434. If it is, then the method is complete and the method proceeds to block 203' (FIG. 18).

If the answer at decision block 434' in FIG. 21 is negative, then the INDEXN is incremented by one (block 436'). The method proceeds to decision block 442' where it is determined if a value stored a buffer D2 location D2 [INDEXN] is greater than a predetermined threshold, such as 254 in the embodiment being described. If it is not, then the method loops back to 434' as shown.

However, if the decision at decision block 442' is yes, then it is determined whether the data value stored at buffer D1 location D1 [INDEXN] or the value stored at data buffer D3 [INDEXN] is less than a predetermined threshold (block 444'), such as one in this embodiment. If either of them are less than the predetermined white threshold, then a flag in the flag buffer F1 is set at location F1 [INDEXN]. This flag identifies a vertical edge, such as edge 36a (FIG. 3), in the image data.

Thereafter, or if the decision at decision block 444' (FIG. 21) is negative, then the method proceeds to increment the INDEXN by one (block 446'). At decision block 449', it is determined if INDEXN is equal to a length of buffer D2. If it is, then the method is complete and it returns to block 201' (FIG. 18). If it is not, however, then the routine loops back to decision block 442' (FIG. 21) as shown.

FIGS. 22A and 22B illustrate a scanning procedure utilized by controller 17 for processing image data in order to locate horizontal areas, such as a horizontal edge or line.

The method starts at block 256' by setting an INDEXP equal to zero. At decision block 257', if the value stored in data buffer D2 at D2 [INDEXP] is less than a predetermined white threshold, then INDEXP is incremented by one (block 258'). At block 260' it is determined if the INDEXP index is equal to the length of the D2 buffer, and, if it is, then the method is complete. If the INDEXP is not equal to the length of the D2 buffer, then the method loops back to decision block 257'. When the decision at block 257' is negative, the method proceeds to block 262' where the white-to-black flag is set in flag buffer at F1 [INDEXP] (block 262'). Next, the INDEXP is incremented by one. A COUNTP is set equal to zero (block 264').

At decision block 268', it is determined if the value stored in data buffer D2 at D2 [INDEXP] is greater than a predetermined black threshold which is set at 254 in this embodiment. If it is, then INDEXP is incremented by one, and the COUNTP is incremented by one at block 270'. The method proceeds to block 266' where it is determined if the INDEXP is equal to the length of the D2 buffer. If it is, the method exits, otherwise, it loops back to block 268' as shown.

At block 272', a LENGTHP is set equal to the COUNTP and the black-to-white flag is set in flag buffer at F1 [INDEXP] (block 274).

The method proceeds to decision block 276' where it is determined if the LENGTHP is greater than a predetermined length, such as 12 samples. If it is not, the method proceeds to block 278' where the INDEXP is set to the INDEXP minus the LENGTHP. At block 280', the flag in the flag buffer is set at F1 [INDEXP]. This flag is a trench flat which identifies data associated with an area where it is desired to locate the modified engraved area, such as trench 100 in FIG. 3. At block 282', the INDEXP is incremented by one and the COUNTP is decremented by one as shown.

At decision block 284', it is determined whether COUNTP is zero. If it is, the method loops back to decision block 257' as shown. If it is not, the method loops back to block 280'.

If the decision at decision block 276' is yes, then the method proceeds to block 286' (FIG. 22B) where the INDEXP is set at the INDEXP minus the LENGTHP.

At block 288', a flag in flag buffer is set at FI [INDEXP]. This flag is a trench flag which identifies data associated with an area where it is desired to locate the modified engraved area, such as trench 100 in FIG. 3. The INDEXP is incremented by one (block 290') and the COUNTP is decremented by one.

It is then determined at decision block 292' whether the COUNTP plus a predetermined value, such as 9 samples, is greater than the LENGTHP. If it is, then the routine loops back to block 288'; otherwise, it proceeds to decision block 294' where it is determined if the COUNTP is greater than another predetermined value, such as 8 samples. If the COUNTP is not greater than the predetermined value, then the INDEXP is incremented by one and the COUNTP is decremented by one at block 296'. The method then loops back to decision block 294' as shown. If the decision at decision block 294' is no, then the flag in the flag buffer is set at F1 [INDEXP] (block 298'). This flag is a trench flag which identifies data associated with an area where it is desired to locate the modified engraved area, such as trench 100 in FIG. 3.

At block 300', the INDEXP is incremented by one and the COUNTP is decremented by one as shown. The method proceeds to decision block 302' where it is determined if the COUNTP is greater than zero. If the COUNTP is greater than zero, then the method loops back to block 298'. If the COUNTP is not greater than zero, then the method proceeds to decision block 304' as shown. At decision block 304', it is determined if the INDEXP is equal to the length of the D2 buffer. If it is, then the procedure is complete. If it is not, the routine loops back to decision block 257' (FIG. 22A) as shown. It should be appreciated that after the horizontal edge scan is performed by controller 17, the horizontal edges or transition in the image data are flagged or identified for further processing by the disable AC routine (FIGS. 26 and 27A–27D).

At this point, controller 17 processes the data in accordance with the copy image data routine (block 204' in FIG. 18) gain or scale routine (block 206') and then the combine routine (block 208') all of which are the same as described above relative to the first embodiment.

Next, controller 17 performs the disable AC routine (block 209' in FIG. 18) which is illustrated in detail in FIGS. 26 and 27A–27D which will now be described. This method or procedure begins at block 554' (FIG. 26) by setting INDEXQ equal to zero. At decision block 556', it is determined if the trench flag in flag buffer at location F1 [INDEXQ] is set. If it is not, the INDEXQ is incremented by one (block 558'). It is then determined (block 560') if the INDEXQ is greater than the length of the flag buffer F1. If it is, then the routine is complete and returns back to block 512' (FIG. 18). Otherwise, it returns to decision block 556' as shown.

If the decision at decision block 556' is yes, then a COUNTQ is set equal to one and the INDEXQ is incremented by one (block 562'). It is then determined at decision block 564' if the valve in the flag buffer at location FI [INDEXQ] has the trench set. If it is set, INDEXQ is incremented by one and the COUNTQ is incremented by one (block 566'). It is then determined if the INDEXQ is greater than a length of the flag buffer F1 (block 568'). If it is, then the routine is complete, otherwise it loops back to decision block 564' as shown.

If the decision at decision block 564' is no, then it is determined (block 570') if the COUNTQ is greater than a preset value, such as two in the embodiment being described. If it is, then an adjust region routine described below is performed by controller 17. If the decision at decision block 570' is negative or after block 572', the method loops back to decision block 556' as illustrated.

It should be appreciated that the disable AC routine facilitates locating all flagged data which represents areas in a final engraved pattern where one or more trenches, such a trench 100 in FIG. 3, should be placed. Once the flagged data is located, the length thereof is determined and stored in COUNTQ. COUNTQ is then used by controller 17 in an adjust region routine which facilitates disabling a portion of the data, so that the trench can be engraved.

The adjust region procedure (block 572' in FIG. 26) will now be described in detail relative to FIGS. 27A–27D.

Referring now to FIG. 27A, the adjust method starts by first adjusting the start region (block 574'), adjusting a center region (block 576'), and then adjusting an end region (block 578'). The adjust region routine defines a procedure for adjusting output data associated with a trench area in order to smooth the transition into and out of the trench.

FIG. 27B illustrates a procedure for adjusting the start region of the trench. The process begins at block 580' by setting an INDEXR variable equal to INDEXQ—COUNTQ (FIG. 26). Also, an INDEXS variable is set equal to INDEXR multiplied by 8. INDEXR is used to locate positions in flag buffer F1 which comprises four samples per engraved area in the embodiment being described. INDEXS is used to locate positions in the output buffer OP which is sampled at 32 samples per engraved area. This makes it necessary to multiply the flag buffer position by 8 in order to find the position in the output buffer OP corresponding to the position in the flag buffer.

At decision block 582' it is determined if a white-to-black flag in flag buffer at location FI [INDEXR] was set at block 262' in FIG. 22. This is done to determine if the trench is starting in a non-engraved or engraved area. If it is, then output buffer OP is filled with a VALUEQ from controller 17 beginning at OP [INDEXS-X], where X is a predetermined length which is set at 8 samples in this embodiment. The output buffer OP is filled through the OP [INDEXS] location with the VALUEQ. The VALUEQ is determined to be 50% of the magnitude of the value listed in the sine wave table (block 344' in FIG. 25).

It should be appreciated that the method generally overwrites data immediately preceding the trench data so that engraving head 22 responds as desired. In order to transition smoothly into the trench, the data immediately preceding the trench is overwritten with transition date. In this regard, FIG. 32 illustrates a combined drive signal 55 having an AC portion 55a and a DC portion 55b which corresponds to the trench to be engraved.

The transition data corresponds to portion 55c which is where the AC portion 55A begins to be disabled. In the embodiment being described, VALUEQ1 is set at 50% of the AC amplitude.

If the decision at block 582' (FIG. 27B) is no, then the same area is filled (block 584') with a VALUEQ2 which is 65% of the AC magnitude (block 344' in FIG. 25).

The start region adjustment method is now complete and the method returns to FIG. 27A, block 576'.

Next, the center region of data corresponding to the trench by setting an INDEXT equal to INDEXR multiplied by 8 (block 588') for reasons described above. A COUNTT is set equal to COUNTQ multiplied by 8.

At block 594', the output buffer OP is filled starting at position OP [INDEXT] through OP [INDEXT+COUNTT] with data value, VALUET. In this embodiment, the VALUE T is set at 74% of the AC magnitude (FIG. 25, block 344'). This causes the trench corresponding to portion 55b in FIG. 32 to be generated.

This method of modifying the combined signal is now complete and the process proceeds to FIG. 27A, block 578'. At this point, an adjust end region procedure is performed as will now be described relative to FIG. 27D.

First, a new INDEXV is set equal to INDEXQ multiplied by 8 (block 610') in FIG. 27D.

At block 610', the flag buffer is checked to see if a flag was set which would indicate that there was a black-to-white edge at F1 [INDEXQ]. If yes, then the output buffer is filled at output buffer locations OP [INDEXV] through OP [INDEXV+Y] (where Y is a predetermined number of samples, such as 8), with a VALUEV1 which is set at 50% of the magnitude of the AC waveform (block 614').

If the decision at block 610' is no, then the same area of output buffer OP is filled with VALUEV2, which is set to the negative of 15% of the magnitude of the AC amplitude. It should be appreciated that the percentages used in FIGS. 27B, 27C and 27D could be set higher or lower as desired.

After blocks 612' or 614', the method of adjusting is complete and the process returns to block 278' (FIG. 27A) and then to block 212' (FIG. 18). At this point the combined data, as it may have been modified as described herein, is ready to be filtered by controller 17 in accordance with the procedure described in FIG. 28 which is substantially the same as the procedure described earlier relative to FIG. 14.

The output gain and offset routine (block 214') is performed next. This routine is shown in FIG. 29 and is substantially the same as the routine described earlier herein relative to FIG. 15.

The output data for at least a portion of the image to be engraved, including any portions thereof that were modified, is engraved (block 216') in the same manner as described earlier herein relative to the first embodiment.

Controller 17 energizes digital-to-analog converter 19 in response to output data generated by output buffer OP in FIG. 30. The converter 19 generates an analog signal, such as 48 in FIG. 5, which is amplified by amplifier 21, and this signal is used to energize engraving head 22.

At decision block 220' (FIG. 18), it is determined if all data for an image to be engraved has been engraved, and if it has, then engraving is complete. Otherwise, the method proceeds to block 222' where new image data is obtained in accordance with the image data routine illustrated in FIG. 31. This routine is substantially the same as the routine shown in FIG. 17 and described earlier herein.

Advantageously, this alternative embodiment permits the engraving of an enlarged area, cell, edge or trench which defines an edge or line in a pattern by identifying transition areas and then generating a signal which will cause a vertical edge, such as the edge 36a in FIG. 3, to be engraved in order to define a sharp line, for example, in a printed image when the engraved pattern is used in a printing process. This procedure also facilitates manipulating engraving input data for an image to be engraved so that a dimension or characteristic of an area to be engraved can be modified or changed in order to provide an engraved pattern having at least one area which is manipulated or modified as desired.

A method of operation will now be described. The cylinder 14 is rotatably mounted between headstock 16 and tailstock 18 at the engraving station 15. Controller 17 energizes drive motor 28 to rotatably drive cylinder 14k in the direction of arrow A (FIG. 2). The controller 17 energizes drive motor 21 to drive carriage 24 towards end 14a of cylinder 14. At this point, one or test cuts may be performed as desired and then engraving can begin.

The image data associated with an image to be engraved is then processed column by column in the manner described earlier herein. In the embodiment being described, engraving is performed by controller 17 energizing drive motor 21 to drive carriage 24 as the engraving head 22 and engraving device 23 is excited in response to the processed image data so as to affect engraving of one or more engraved areas or cells which make up a pattern, such as the pattern 34 shown in FIG. 2.

After engraving is complete, controller 17 can energize drive motors 46 and 48 to retract headstock 16 and tailstock 18, respectively, so that cylinder 14 can be removed.

Cylinder 14 may then be put in a printing press so that printing on a workpiece can be performed.

Advantageously, this invention facilitates manipulating image data so that areas engraved in response to that data have desired characteristics. For example, this invention facilitates defining sharp or generally non-jagged lines or edges in the pattern engraved. This, in turn, facilitates engraving characters or images having fine detail.

The method and apparatus described herein also facilitates easy identification of transition areas and manipulation of image data.

Further, the method and apparatus provides means for identifying an area of image data to be modified and modifying or changing that data in accordance with a predetermined shaping waveform which further facilitates achieving the advantages described herein.

The filtering means and method described herein facilitate compensating the output data in order to maximize the performance of the engraving head 22. Also, the filtering means and method described herein facilitates filtering a signal comprised of a steady state and video components, regardless of whether one or more or all of those components have been modified in accordance with the procedure described herein.

It has been found that the method and apparatus described herein is programmable and easily adjustable to provide an engraving system and apparatus which is easily adaptable.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. A method for engraving an image having at least one line on a cylinder in an engraver, comprising the steps of:
    combining a video signal with a steady state signal to provide at least one combined signal corresponding to a plurality of engraved areas which make up at least a portion of said image;
    overwriting a portion of said at least one combined signal with a shaping signal in order to alter a dimension of at least one of said plurality of engraved areas.

2. The method as recited in claim 1, further comprising the steps of:
    using said at least one combined signal to detect an edge; and
    shaping at least a portion of said at least one combined signal in response to said edge.

3. The method as recited in claim 1, further comprising the step of:
    shaping at least a portion of said at least one combined signal such that at least one of said engraved areas comprises a compressed cell.

4. The method as recited in claim 1, further comprising the step of:
    shaping at least a portion of said at least one combined signal such that at least one of said plurality of engraved areas comprises a trench.

5. The method as recited in claim 1, further comprising the step of:
    overwriting a portion of said combined signal with said combined shaping signal to alter a width or length of at least one of said plurality of engraved areas.

6. The method as recited in claim 1, further comprising the step of:
    modifying at least a portion of said at least one combined signal to provide a modified signal having a substantially linear region.

7. The method as recited in claim 1, further comprising the step of:

modifying at least a portion of said at least one combined signal to provide a modified region corresponding to a compressed engraved area.

8. The method as recited in claim 1, further comprising the step of:

modifying at least a portion of said at least one combined signal to provide a modified region corresponding to a shifted engraved area.

9. The method as recited in claim 8 wherein at least one line is a vertical line corresponding to said trench.

10. The method as recited in claim 1, further comprising the step of;

modifying a least a portion of said at least one combined signal to provide a modified region corresponding to a trench.

11. The method as recited in claim 1 wherein said at least one of said plurality of engraved areas comprise at least one cell.

12. The method as recited in claim 1, further comprising the step of:

using a shaping signal to modify at least a portion of said at least one combined signal to provide a modified signal.

13. The method as recited in claim 1, further comprising the step of:

selecting said shaping signal from a plurality of shaping signals.

14. The method as recited in claim 13 further comprising the step of:

generating a table of said plurality of shaping signals;
accessing said table to obtain said selected shaping signal.

15. The method as recited in claim 1, further comprising the step of:

providing a table comprising a plurality of shaping signals;
accessing said table to obtain said shaping signal.

16. A method for modifying a cell characteristic of a cell to be engraved in a surface of a workpiece comprising the steps of:

identifying said cell to be modified; and
modifying an engraving signal corresponding to said cell with a shaping signal in order to change at least one engraving characteristic of said cell;
said engraving signal being a data signal combination of a steady state signal and a video signal.

17. The method as recited in claim 16, further comprising the step of:

modifying said engraving signal with a shaping signal such that said cell becomes compressed.

18. The method as recited in claim 16, further comprising the step of:

using a shaping signal which will shift a center of said cell from a first location on the cylinder to a second location on the cylinder.

19. The method as recited in claim 16, further comprising the step of:

using a shaping signal which will shift and compress said cell.

20. The method as recited in claim 16, further comprising the step of:

selecting said at least one engraving characteristic to be a cell width.

21. The method as recited in claim 16, further comprising the step of:

causing said modified cell to be positioned among at least one unmodified cells to define an edge on said surface.

22. The method as recited in claim 16, further comprising the step of:

modifying said engraving signal with a shaping signal that defines at least one trench.

23. The method as recited in claim 16, further comprising the step of:

modifying said engraving signal with a shaping signal that defines a filler cell.

24. The method as recited in claim 23 wherein said filler cell is compressed.

25. The method as recited in claim 16 wherein said engraving signal corresponds to data corresponding to a plurality of cells.

26. The method as recited in claim 16, further comprising:
using a shaping signal that facilitates defining an edge.

27. The method as recited in claim 16, further comprising:
using a shaping signal that facilitates defining an edge which is not parallel with an axis of said cylinder.

28. The method as recited in claim 16, further comprising:
modifying said engraving signal using a shaping signal obtained from a look-up table.

29. The method as recited in claim 28, further comprising:
selecting said shaping signal from a table comprised of a plurality of shaping signals.

30. A method for engraving a plurality of engraved areas corresponding to an image comprising the steps of:

modifying a characteristic of at least one of said plurality of engraved areas to provide at least one engraved area;
generating a shaping signal in response to said at least one modified engraved area;
replacing a portion of a combined signal using said shaping signal to provide a modified signal; and
energizing an engraving device to engrave a pattern in response to said modified signal.

31. The method as recited in claim 30 further comprising the step of:

modifying a size of said at least one of said plurality of engraved areas.

32. The method as recited in claim 30 further comprising the step of:

modifying a width of said at least one of said plurality of engraved areas.

33. The method as recited in claim 30 wherein said characteristic comprises a size of said at least one of said plurality of engraved areas, further comprising the steps of:

modifying said at least one of said plurality of engraved areas such that said area defines a trench.

34. The method as recited in claim 33 wherein said trench defines an edge in said pattern.

35. The method as recited in claim 30 wherein said characteristic comprises a size of said at least one of said plurality of engraved areas, further comprising the step of:

modifying said at least one of said plurality of engraved areas such that said area becomes compressed.

36. The method as recited in claim 30, wherein said method further comprises the step of:

causing said at least one modified engraved area to be situated among a plurality of engraved areas which were not modified.

37. The method as recited in claim 30, wherein said method further comprises the step of:

causing said at least one modified engraved area to be situated among a plurality of engraved areas which were not modified so that they define an edge.

38. The method as recited in claim 30, wherein said method further comprises the step of:

modifying said first signal using a shaping signal.

39. The method as recited in claim 38, wherein said method further comprises the step of:

selecting said shaping signal from a plurality of signals located in a table.

40. A method of engraving comprising the steps of:

rotatably mounting a cylinder in an engraver;

situating an engraving device in operative relationship with said cylinder;

generating a combined signal corresponding to at least one of a plurality of engraved areas using a video signal and an AC signal, identifying a shaping signal to modify a characteristic of at least one of said plurality of engraved areas to provide at least one modified engraved area;

modifying said combined signal using said shaping signal to provide a modified signal; and energizing an engraving device to engrave a pattern in response to said modified signal.

41. The method as recited in claim 40 further comprising the step of:

using a shaping signal which will cause a size of said at least one of said plurality of engraved areas to be modified.

42. The method as recited in claim 40 further comprising the step of:

using a shaping signal which will cause a width of said at least one of said plurality of engraved areas to be modified.

43. The method as recited in claim 40 wherein said characteristic comprises a size of said at least one of said plurality of engraved areas, said method further comprising the step of:

using a shaping signal which will cause said at least one plurality of engraved areas to define a trench.

44. The method as recited in claim 43 wherein said trench defines an edge in said pattern.

45. The method as recited in claim 40 wherein said characteristic comprises a size of said at least one of said plurality of engraved areas, said method further comprising the step of:

using a shaping signal which will cause said at least one of said plurality of engraved areas to become compressed.

46. The method as recited in claim 40, wherein said method further comprises the step of:

causing said at least one modified engraved area to be situated among a plurality of engraved areas which were not modified.

47. The method as recited in claim 40, wherein said method further comprises the step of:

causing said at least one modified engraved area to be situated among a plurality of engraved areas which were not modified so that they define an edge.

48. The method as recited in claim 40, wherein said method further comprises the step of:

replacing a portion of said combined signal using a shaping signal.

49. The method as recited in claim 48, wherein said method further comprises the step of:

selecting said shaping signal from a plurality of signals located in a table.

50. A method of engraving a pattern comprising a plurality of engraved areas comprising the steps of:

adjusting a characteristic of at least one of said plurality of engraved areas to change a spatial relationship between said at least one of said plurality of engraves areas and another of said plurality of engraved areas;

performing said adjusting step by engraving said pattern which is shaped from a combined signal comprising a steady state signal and a video signal.

51. The method as in claim 50, further comprising:

adjusting a location of said at least one of said plurality of engraved areas relative to said another of said plurality of engraved areas.

52. The method as in claim 50, further comprising:

adjusting a dimension of said at least one of said plurality of engraved areas relative to a second dimension of another of said plurality of engraved areas.

53. The method as in claim 52, further comprising:

selecting a width as said dimension.

\* \* \* \* \*